(12) United States Patent
Patrikakis

(10) Patent No.: US 7,429,115 B2
(45) Date of Patent: Sep. 30, 2008

(54) VEHICLE MIRROR SYSTEM FOR PROVIDING VIEWS ALONG A SIDE AND A BLIND-SPOT OF A VEHICLE INCLUDING AT LEAST ONE PRISM AND TWO REAR-FACING, NON-PARALLEL FLAT MIRRORS

(76) Inventor: Pano Yiotis Patrikakis, 1175 Broadview Avenue, Suite 1103, Toronto, Ontario (CA) M4K 2C9

( * ) Notice: Subject to any disclaimer, the term of this patent is extended or adjusted under 35 U.S.C. 154(b) by 306 days.

(21) Appl. No.: 10/538,052

(22) PCT Filed: Dec. 4, 2003

(86) PCT No.: PCT/CA03/01877

§ 371 (c)(1),
(2), (4) Date: Jun. 8, 2005

(87) PCT Pub. No.: WO2004/052685

PCT Pub. Date: Jun. 24, 2004

(65) Prior Publication Data

US 2006/0034005 A1 Feb. 16, 2006

(30) Foreign Application Priority Data

Dec. 12, 2002 (CA) .................................... 2414059
Aug. 13, 2003 (CA) .................................... 2437179
Nov. 12, 2003 (CA) .................................... 2449162

(51) Int. Cl.
*G02B 5/08* (2006.01)
(52) U.S. Cl. ..................................................... 359/861
(58) Field of Classification Search ................. 359/833, 359/844, 862, 850, 856, 857, 861
See application file for complete search history.

(56) References Cited

U.S. PATENT DOCUMENTS 2,501,067 A * 3/1950 Lusebrink .................... 359/833
5,500,766 A 3/1996 Stonecypher
5,541,762 A * 7/1996 Levy .......................... 359/240
6,062,699 A 5/2000 O'Dea

FOREIGN PATENT DOCUMENTS

FR 7329776 3/1975
WO WO 9532103 A1 * 11/1995

* cited by examiner

*Primary Examiner*—Stephone B. Allen
*Assistant Examiner*—Jennifer L Doak
(74) *Attorney, Agent, or Firm*—Rolf Fasth; Fasth Law Offices

(57) ABSTRACT

A mirror system for a vehicle having driver's side viewing device located in a mirror housing mounted on the vehicle wherein a first section of the mirror housing contains a viewing surface in the interior of the vehicle and a second portion of the mirror housing is optically open to the outside of the vehicle; said first section of the mirror housing adapted to contain one or more substantially right angle triangular prisms having two sides of substantially equal length and two vertices of substantially equal angles; said prism mounted in the first section of the mirror housing so that one of the two sides of equal length of said prism is positioned in an opening facing the interior of the vehicle to provide a viewing surface; the second one of the sides of equal length is facing to the exterior of the vehicle; said second section of the mirror housing sized and shaped to contain operative optical elements comprising one or more reflective means mounted in the second section of the mirror housing at an angle to the second one of the sides of equal length of the prism(s) in the first section of the mirror housing so that when the driver looks through the viewing surface of the prism he can see objects to the side and rear of the vehicle.

17 Claims, 20 Drawing Sheets

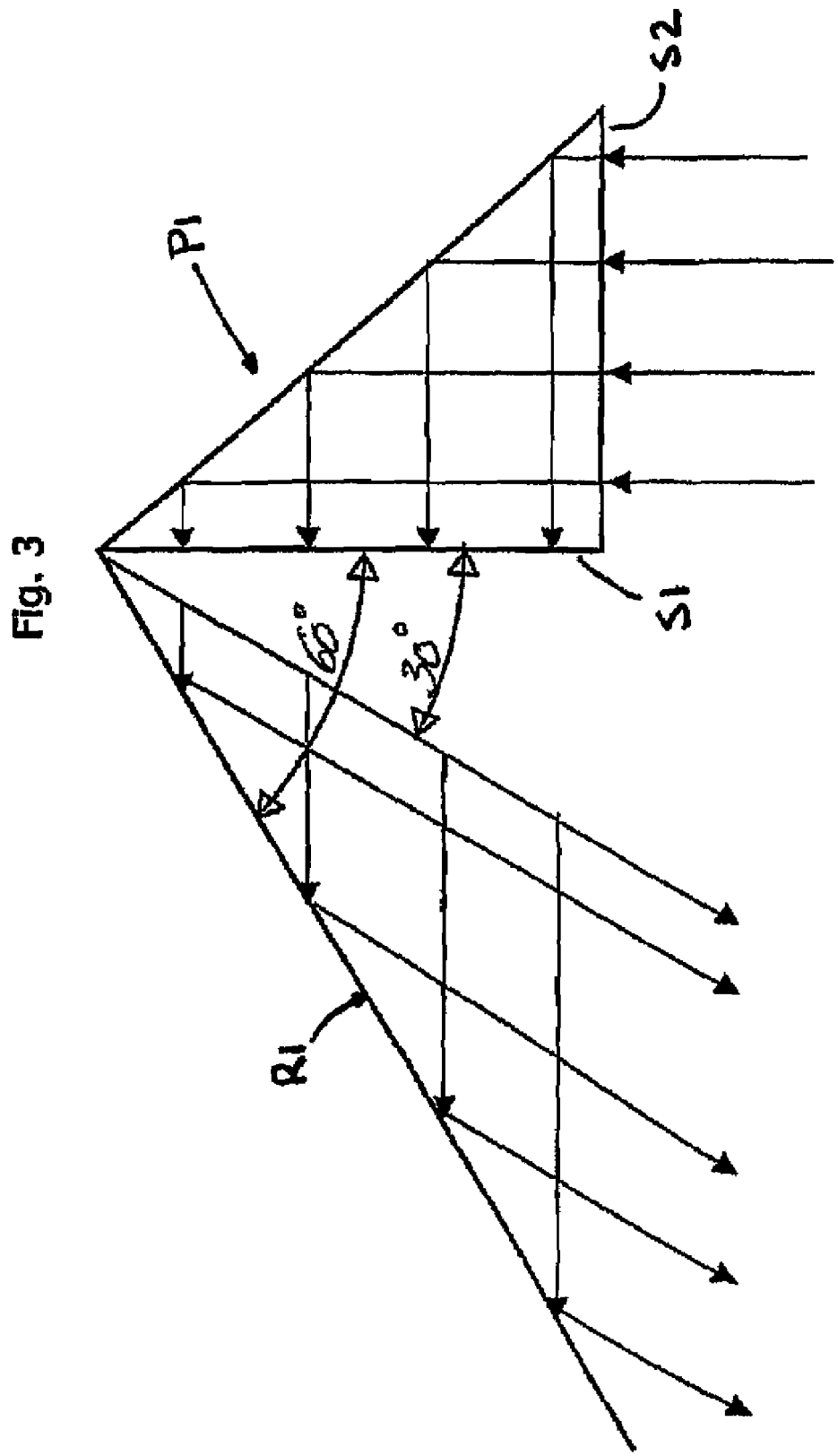

US 7,429,115 B2

VEHICLE MIRROR SYSTEM FOR PROVIDING VIEWS ALONG A SIDE AND A BLIND-SPOT OF A VEHICLE INCLUDING AT LEAST ONE PRISM AND TWO REAR-FACING, NON-PARALLEL FLAT MIRRORS

FIELD OF THE INVENTION

The present invention relates to a vehicle (car, truck, van, motorcycle etc.) mirror system. In particular the present invention provides a mirror design that has the capability to permit a driver to clearly see and check the angle of view referred to as the blind spot on the sides of the vehicle.

BACKGROUND OF THE INVENTION

There are many designs of mirrors that are used by all sorts of vehicles. Generally due to the manner that mirrors are designed and installed on vehicles the driver does not have a comprehensive view on either side of the vehicle.

Present mirrors on for example, automobiles do not provide total coverage of the viewing area on both sides of the automobile. The driver of a vehicle usually has a rear view mirror and conventional left and right side view mirrors on each side of the vehicle. There is a blind spot created for the driver when both his rear view mirror and side view mirrors are properly and conventionally adjusted. This "blind spot" prevents the driver from viewing a predetermined area behind and the side of his vehicle by the use of the rear view and side view mirrors. A driver checking the view from both the rear view and side view mirrors cannot see a vehicle, which is in an adjacent lane, in a "blind area" along side his vehicle.

Typically, the rear view mirror provides a viewing angle of about thirty degrees. This angle may, of course, vary somewhat, but thirty degrees is typical and any variations will not be greater than about plus or minus five degrees.

The rear view mirror gives a partial view of the adjoining lanes of traffic when it is correctly adjusted so that if a car in an adjacent lane is far enough behind, the driver will see the car in his rear view mirror.

The driver's side view mirror is normally tilted at an angle of about twenty degrees (plus or minus one or two degrees) to a line drawn at right angles to the longitudinal axis of the car, depending upon the position of the driver, the distance between his eyes, his height and position in the seat.

A driver to help him see towards the rear and along the side of his car, to cover the view of the adjacent lane, tilts the driver's side view mirror. In positioning the driver's side view mirror, the driver must maintain some rearward part of his vehicle in view in order to have some base or reference point to judge how far other cars are to the rear.

Therefore, with respect to the driver's side view mirror the field of view is determined by the angle of the mirror and a driver cannot see anything to the left of a line of sight of the driver's side view mirror.

A similar problem occurs with the passenger's side view mirror creating a blind spot on the right side of the line of sight defined by the right side mirror.

In jurisdictions where they drive on the right side of the road, for the right side blind spot a driver has to turn his head to his right to an angle of around 120 degrees in order to check the blind spot. For the left side blind spot a driver has to turn his head to at least 90 degrees in order to check the blind spot. This is reversed in countries where they drive on the left side of the road.

Various solutions have been attempted to minimize the blind spot and avoid the driver having to turn his head to check the blind spot. For example, proposed solutions range from providing a supplemental mirror placed at an angle to the rear view mirror (see U.S. Pat. No. 4,832,476) or two or more flat mirrors juxtaposed to give different angles of view (see U.S. Pat. No. 4,200,359 or U.S. Pat. No. 6,062,699) or small convex mirrors that are attached on the conventional automobile side mirrors that show the blind spots (see U.S. Pat. No. 3,104,274). With the convex mirrors, an object that one sees is closer than it appears. This makes these mirrors dangerous in the sense that if a driver miscalculates when he/she changes lanes, she/he may cause an accident.

Other solutions have proposed the use of one or are prisms. For example U.S. Pat. No. 5,245,479 relates to an automotive, side, rear view mirror accessory in the form of a small flat mirror or prism configured to be adhesively attached to the surface of a standard automotive side view mirror, in an effort to provide the user with a wider scope of vision with regard to the reflected image in the mirror.

The small flat mirror or prism is located at the outer edge, namely, on the outer, left edge for the driver's side, view mirror and on the outer, right edge of the side view mirror on the passenger's side. The prism mirror in this reference cannot be adjusted independently of the side view mirror to accommodate the sitting position of the driver.

The light is refracted upon entering the prism and then reflected through the same side by the flat mirror on which the prism is mounted or a reflective coating on the backside of the prism to permit a wider viewing angle. The two adjacent sides of the mirror prism are of unequal length and the prism is not receiving incident light at 90 to the left of the prism.

U.S. Pat. No. 5,594,594 describes a triangular prism mirror mounted above or below a conventional side view mirror to enable the driver to view the blind spot area without any distortion of vision. The triangular prism mirror unit has three plane surfaces, the rear surface being blocked. By blocking (coating) the rear surface of the prism, the image entering one of the front surfaces will appear on the other front surface. By having the prism mirror situated above the conventional one it looks awkward and bulky and not at all eye-pleasing. The blind spot mirror obstructs part of the view of the driver which is just above the conventional mirror and that means the driver cannot check far ahead distances.

U.S. Pat. No. Re. 30,673 discloses a composite mirror assembly adapted to be mounted adjacent the driver of a vehicle to enable the driver to view objects, as other vehicles, within an area normally hidden from view by conventional vehicle mirrors. An additional mirror is positioned at an angle with respect to the conventional side mirror. FIG. 4 of this patent shows a prism attached to the face of a conventional mirror. The prism has a viewing surface at an angle of about 12 to 20 degrees to the surface of the flat mirror. No two sides of the mirror prism are the same length. The prism deflects light onto the surface of flat mirror in an effort to provide a view of the blind spot. The incident angle (what the eye is looking at) is much smaller than the viewing angle. This does not help the driver because what and how much area of the blind spot the driver sees has to be equal of the viewing area of the blind spot if items are to remain undistorted. In addition, the prism mirror is attached (affixed) to the conventional mirror, that means that if the conventional mirror is not set properly you can't really see clearly the blind spot. This mirror prism is not independently adjusted to accommodate the driver.

Further, because of the way the blind spot mirror is placed on the conventional mirror, it is not protected from surrounding shadows, reflections and of the elements (rain, snow) at all times. In other words there are elements that do not inspire confidence of seeing clearly the blind spot at all times.

Other more sophisticated methods of eliminating the blind spot have been proposed with the use of radar and cameras.

Other problems associated with side view mirrors relates to the surface area of the mirror protruding beyond the exterior surface of the vehicle causing reduced fuel efficiency, aerodynamic noise and vulnerability to damage.

Numerous solutions have been proposed for low profile mirrors using various reflective and refractive devices so the image is presented inside the car. Passive systems such as those disclosed in U.S. Pat. Nos. 5,594,593; 5,617,245; 5,914,815 and 6,424,474 have been rejected in view of the high cost, no substantial improvement in viewing area over conventional side view mirrors, flare and secondary reflections.

There is a need for a comprehensive solution that permits viewing of the blind spot and has a low profile.

SUMMARY OF THE INVENTION

One aspect of the present invention is intended to provide a mirror system that can show a driver if another vehicle is in the blind spot at the side of the vehicle.

Another aspect of the present invention is to provide a mirror system that will permit a driver to view the side and rear of the vehicle, including the blind spot, without the need for a driver to turn his head to check the blind spot.

Another aspect of the present invention is to provide a mirror system that shows objects as they appear at real distances.

Accordingly in one embodiment of present invention mirror system for a vehicle is provided comprising a driver's side viewing device located in a mirror housing mounted on the vehicle wherein a first section of the mirror housing contains a viewing surface in the interior of the vehicle and a second portion of the mirror housing is optically open to the outside of the vehicle. The first section of the mirror housing is adapted to contain one or more substantially right angle triangular prisms having two sides of substantially equal length and two vertices of substantially equal angles. The prism is mounted in the first section of the mirror housing so that one of the two sides of equal length of said prism is positioned in an opening facing line of sight of the driver of the vehicle to provide a viewing surface. The second one of the sides of equal length is facing to the exterior of the vehicle.

The second section of the mirror housing is sized and shaped to contain operative optical elements comprising one or more reflective means mounted in the second section of the mirror housing at an angle to the second one of the sides of equal length of the prism (s) in the first section of the mirror housing so that when the driver looks through the viewing surface of the prism he can see objects to the side and rear of the vehicle.

In a further aspect the driver's side viewing device includes a first flat mirror positioned in the second section of the mirror housing in a manner to permit the driver to look through a first section of the viewing surface of the prism and see if another vehicle is in the blind spot area along the side of the vehicle.

In a still further aspect the driver's side viewing device includes a second flat mirror mounted in the second section of the mirror housing in a manner to permit the driver to look through the a second section of the viewing surface of the prism and see to the rear and along the side of the vehicle.

In another aspect the mirror system for a vehicle further includes a passenger's side viewing device located in a second mirror housing mounted on the vehicle. The second mirror housing is sized and shaped to contain operative optical elements, said operative optical elements comprising two different reflective means mounted in the mirror housing at an angle so that the driver can see objects to the passenger side and rear of the vehicle. The two different reflective means mounted in the passenger's side viewing device preferably comprise a first flat mirror positioned in the mirror housing in a manner to permit the driver to see if another vehicle is in the blind spot area along the side of the vehicle and a second flat mirror mounted in a manner to permit the driver to see to the rear and along the side of the vehicle.

In another embodiment of the mirror system of the present invention there is provided a blind spot mirror for use with a typical vehicle side view mirror mounted in a mirror housing adapted to be attached to the side of a vehicle.

The mirror housing typically has a generally rearwardly open box configuration with a first end adapted for attachment to the vehicle, a remote end and top, bottom and front walls. The vehicle side view mirror is mounted in the rear opening of the mirror housing. The blind spot mirror of the present invention comprises a right angle prism mounted adjacent the remote end of the mirror housing in a manner to permit adjustment of the prism to accommodate drivers of different sizes. The right angle prism is further equipped with means to protect it from damage and weather conditions.

One embodiment of the means to protect the prism from damage and weather conditions comprises mounting the prism in a manner that it can be rotated from an open to a closed position. Alternatively a transparent cover can be placed over the opening in said housing through which the prism and side view mirror can be seen.

BRIEF DESCRIPTION OF THE DRAWINGS.

Preferred embodiments of the invention are shown in the drawings, wherein:

FIG. 3 is a ray diagram illustrating how light is reflected by a flat mirror through a right angle prism to view objects to the side and 60 degrees to the rear of the prism.

DETAILED DESCRIPTION OF THE PREFERRED EMBODIMENTS

Figure 1:
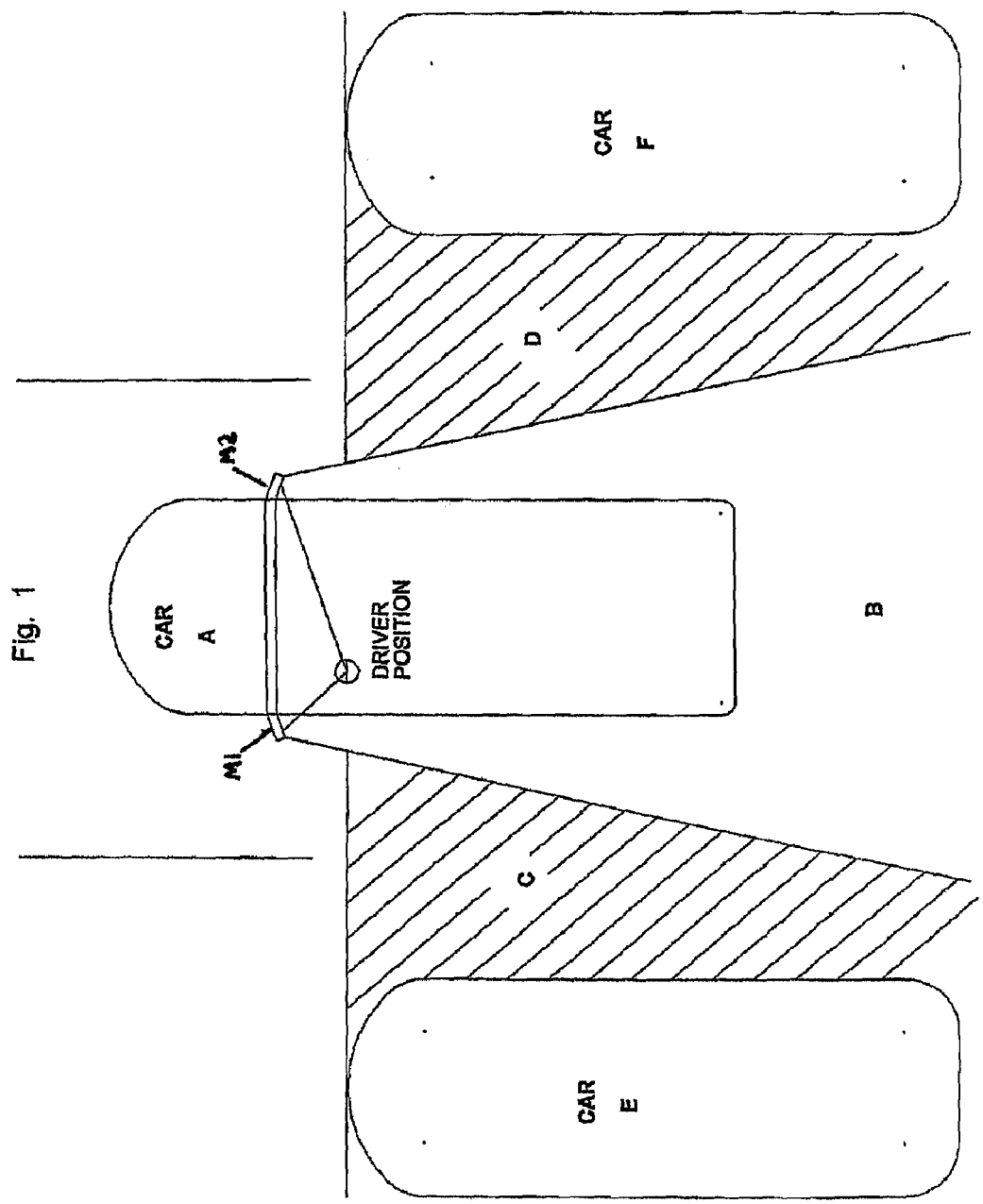
FIG. 1 is a schematic representation illustrating the blind spots using conventional vehicle side and rear view mirrors.

Traditionally, due to the manner that mirrors were designed and installed on automobiles, the driver's view was impeded by not having a comprehensive view on either side of the vehicle. Conventional side view mirrors on vehicles do not provide total coverage of the viewing area on both sides of the automobile. With reference to FIG. 1 the typical viewing areas and identification of the blind spots C, D to the left and right of the vehicle A are illustrated. In the subject vehicle A, conventional side view mirrors M1, M2 on the left and right side of the vehicle A permit a driver to see the area designated B. The areas C and D on the left and right side of the subject vehicle A are characterized as the blind spots. The driver of subject vehicle A will not be able to see vehicles E or F using the conventional side view mirrors as they are in the blind spot. In order for the driver of vehicle A to check the blind spots on the left and right side of his vehicle, the driver must turn his head to the side and rear to see directly to the blind spot to ensure no vehicles are present. For the right side blind spot the driver has to turn his head to his right to an angle of around 120 degrees in order to check the blind spot. For the left side blind spot the driver has to turn his head to at least 90 degrees in order to check the blind spot. The driver must do these two head movements in sequence and hi split second timing in order to ensure his safety and the traffic on his sides before proceeding in changing lanes in a highway. The major advantage of the design of the present invention is that it minimizes the amount a driver must turn his head to the side and rear to see to the side and rear to ensure no vehicles are present.

The present invention takes advantage of a number of the optical properties of a right angle triangular prism with two equal angles of 45 degrees. Refraction is the bending of light through a substance. Different substances bend light at different angles. As light passes from one transparent substance to another, it changes speed, and bends. How much this happens depends on the refractive index of the substances and the angle between the incident light ray and the line perpendicular (normal) to the surface of the interface of the two substances. Each substance has a different refractive index. The angle between the light ray and the normal as it leaves a substance is called the angle of incidence. The angle between the light ray and the normal as it enters a second substance is called the angle of refraction.

Snell's Law determines the relationship between different angles of light as it passes from one transparent substance to another. When light passes from one transparent substance to another, it bends according to Snell's law which states: Ni×Sin(Ai)=Nr×Sin (Ar), where: Ni is the refractive index of the substance the light is leaving, Ai is the incident angle between the light ray and the normal to the interface of the substances, Nr is the refractive index of the substance the light is entering, Ar is the refractive angle between the light ray and the normal to the interface.

As the incident light approaches a critical angle the refracted light approaches 90 or −90 degrees. At the critical angle, the angle of refraction becomes 90 or −90 and the light is no longer transmitted across the interface but parallel to the interface. For angles greater in absolute value than the critical angle, all the light is reflected. This is called total reflection. The formula to calculate the critical angle of a material/air interface is:

Critical angle=sin-'($1/n$) where $n$ is the refractive index of the material. The critical angle for most glass is about 42.

Figure 2:
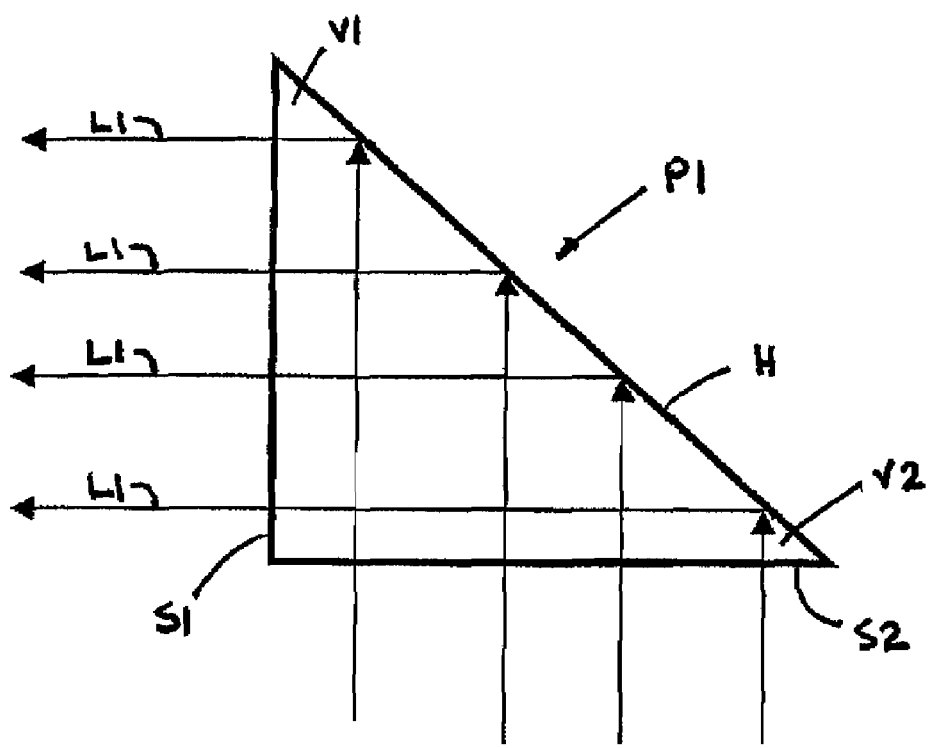
FIG. 2 is a ray diagram illustrating how light is reflected through a right angle prism to view objects to the side of the prism.

The ray diagram in FIG. 2 illustrates schematically how incident light is reflected through a right angle triangular glass prism P1 with two sides S1, S2 of equal length and two vertices VI, V2 of equal angles (i.e. 45) so that it can be used to view objects at 90 to the side of the prism. The right angle prism P1 may have the exterior surface of its hypotenuse H coated with an opaque or reflective coating to block ambient light from back lighting the prism. Incident light LI from an object (not shown) to the left of the prism P1 hits the surface of the first of the two equal sides S1 of the prism perpendicular to its surface. The incident light LI is not refracted (bent) because it is entering the prism perpendicular to the surface. The incident light then strikes the ulterior surface of the hypotenuse H at 45 degrees, an angle greater than the critical angle for glass. Rather than being refracted and leaving the prism, the light L1 is totally reflected at 45 degrees to the second of the two equal sides S2 of the prism P1. The reflected light is perpendicular to the surface of the second of the two equal sides S2. The reflected light exits the prism at right angles to the surface of the second of the two equal sides, so again there is no refraction or dispersion. The eye of the viewer (not shown) looking at side S2 sees the object in the second of the two equal sides S2 of the prism.

The image of the object appears to the eye as it appears (no distortion) and at real distances but rotated 180.

The ray diagram in FIG. 3 illustrates schematically how incident light is reflected through a right angle triangular glass prism with two sides of equal length and two vertices of equal angles (i. e. 45) so that it can be used in conjunction with a second reflective or refractive means, in this case a flat mirror, so that objects other than those at 90 to the left of the prism can be viewed.

Figure 4A:
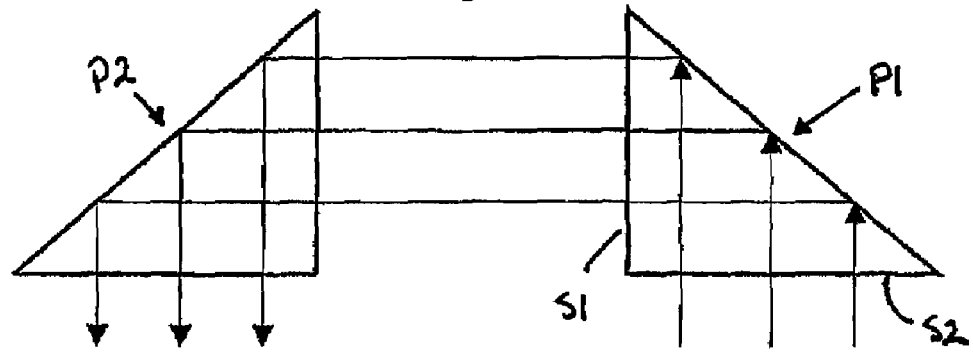
FIG. 4A is a ray diagram illustrating how light is reflected by a first right angle prism through a second right angle prism to view objects to the side and 90 degrees to the rear of the second prism.
Figure 4:
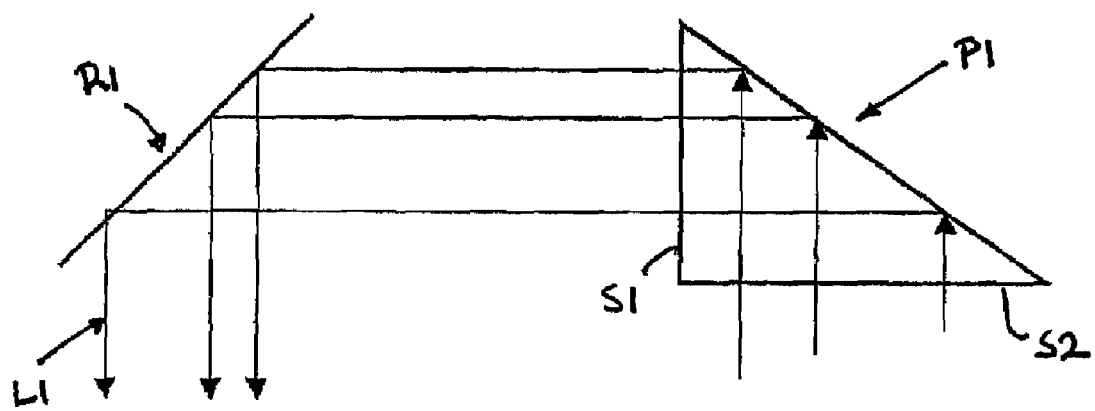
FIG. 4 is a ray diagram illustrating how light is reflected by a flat mirror through a right angle prism to view objects to the side and 90 degrees to the rear of the prism.

For example FIG. 3 shows how a flat mirror R1 placed at an, angle to the surface of the first of the two equal sides S1 of the right angle prism P1 can be used to view objects (not shown) to the left and rear of the prism P1. For example if the flat mirror R1 is placed at an angle of 60 degrees as shown in FIG. 3, when looking at the surface of the second of the two equal sides S2 of prism P1. objects behind and in a field of vision 60 degrees to the surface of the first of the two equal sides S1 of the prism, can be seen. By making the two sides S1, S2 equal length, the size of the field of vision matches the size of area that can be seen in the second side. If the flat mirror R1, in FIG. 3, is placed at an angle of 45-50 degrees (as shown in FIG. 4), when looking at the surface of the second of the two equal sides S2 of the prism P1, objects behind and in a field of vision about 45 to 50 degrees to the surface of the first of the two equal sides S1 of the prism P1, can be seen. The flat mirror R1 can be replaced by a second right angle prism P2 having two sides of equal length to see to the rear as shown in FIG. 4A.

Figure 5:
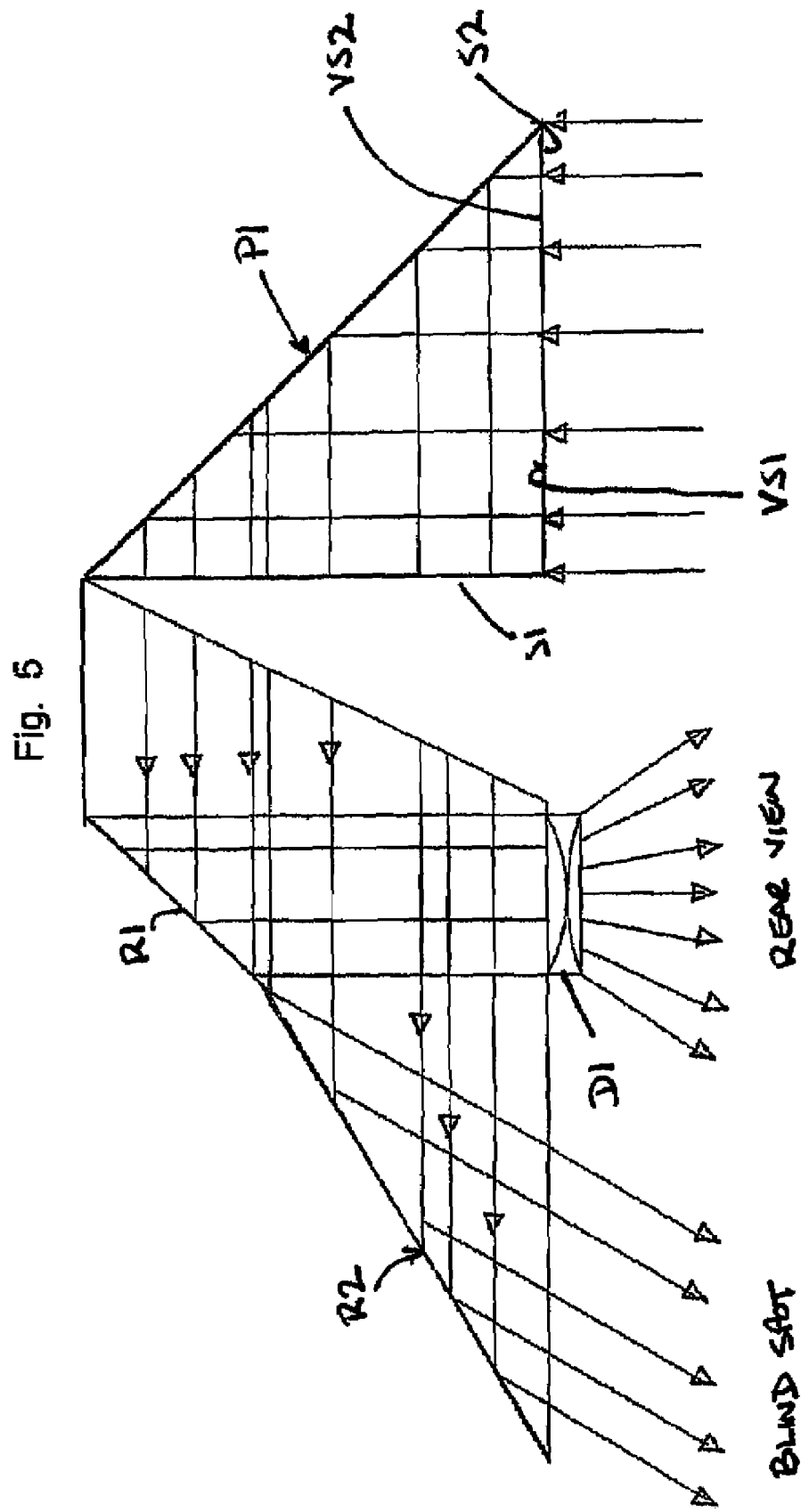
FIG. 5 is a ray diagram illustrating how light is reflected by a flat mirror through a right angle prism to view objects to the side and rear of the prism and the field of view is expanded using a divergent lens in front of the flat mirror.

The field of view can be expanded in either FIG. 3 or 4 by utilizing in combination with the right angle prism P1 and flat mirror R1 (or second prism) a diverging lens DL as shown in the ray diagram in FIG. 5. In FIG. 5 a plano concave lens DL placed between the flat mirror R1 and the object (not shown) to the rear expands the field of vision. The use of a divergent lens will cause some distortion in the image of the object as it appears in a first part VS1 of the surface of the second of the two equal sides S2 of the prism, which may not be desirable. In FIG. 5 a second flat mirror R2 is provided similar to the arrangement in FIG. 3 and objects to he left and rear of the prism are seen in a second part VS2 of the surface of the second of the two equal sides S2 of the prism.

Figure 6:
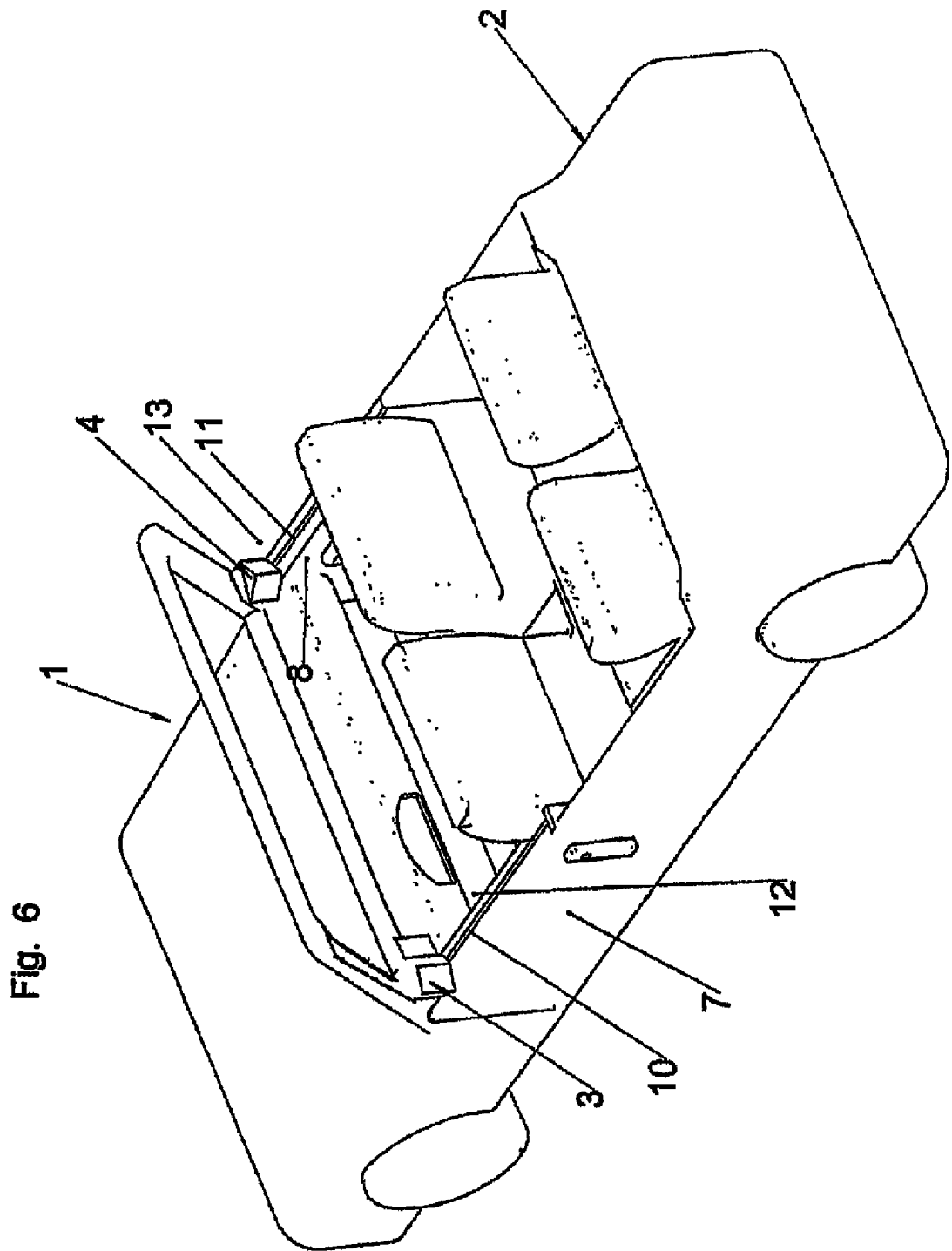
FIG. 6 is a perspective schematic view of an automobile equipped with one embodiment of the mirror system according to the present invention installed on the doorframes of the automobile.
Figure 7:
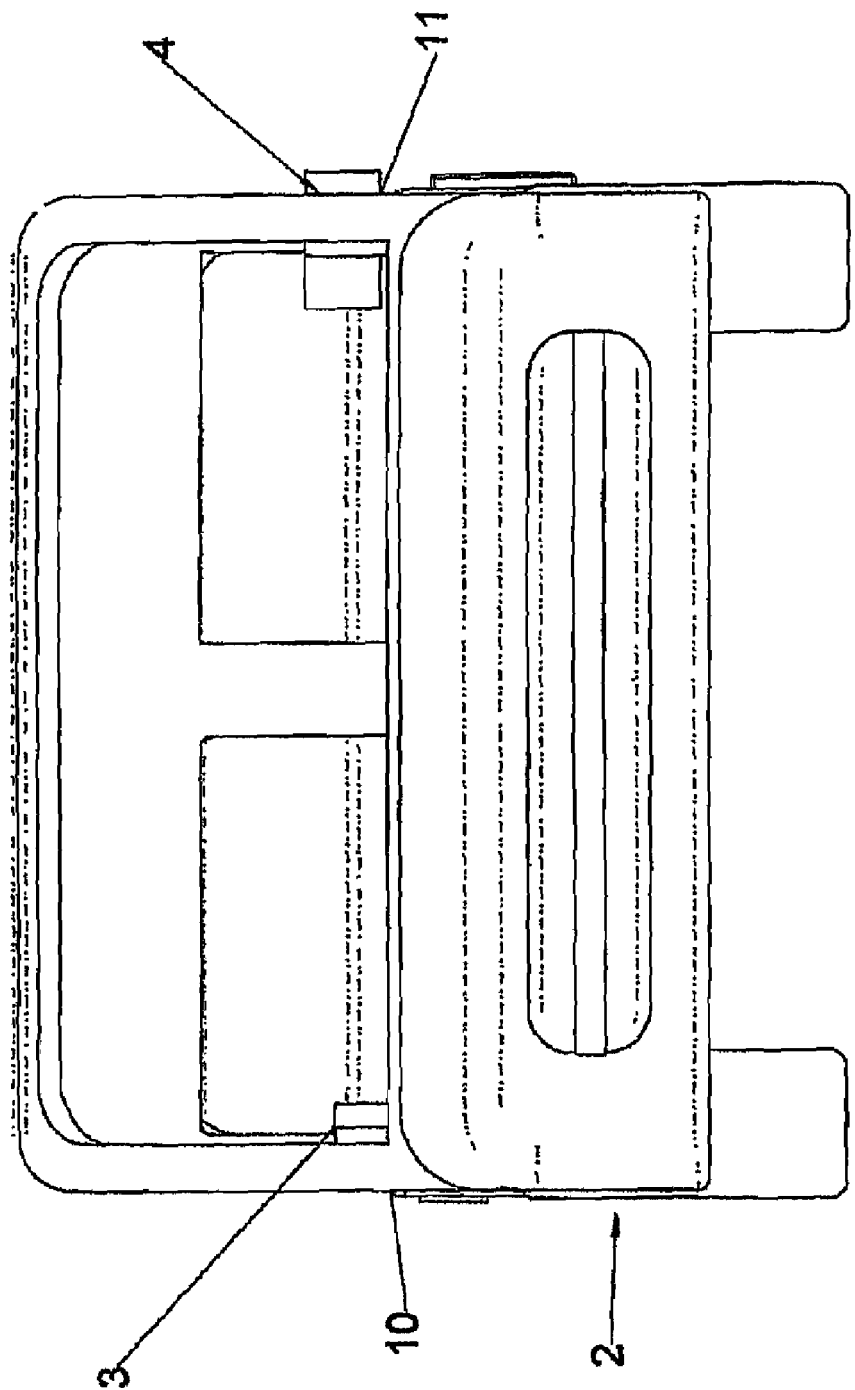
FIG. 7 is a rear plan view of the automobile of FIG. 6.
Figure 8:
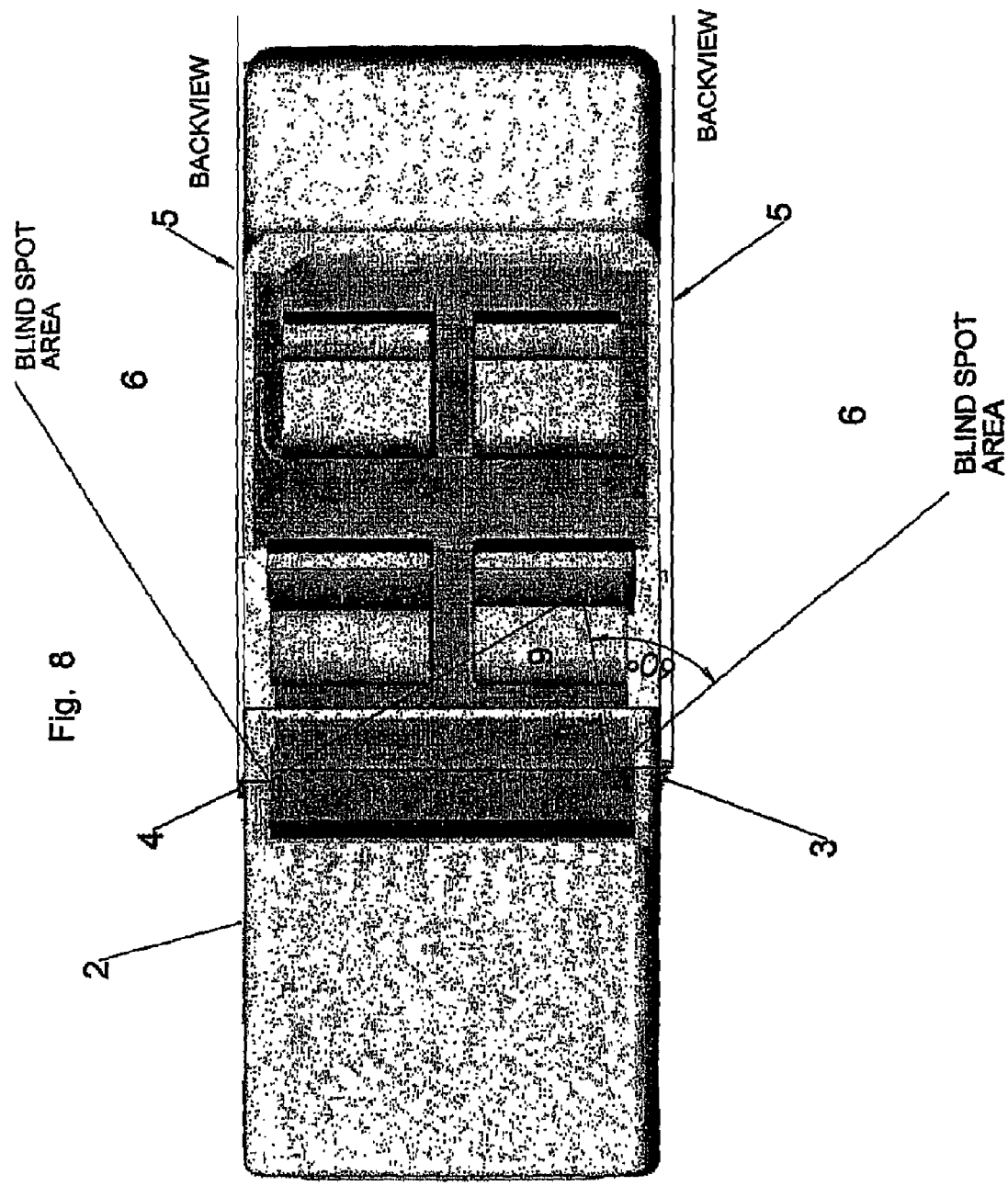
FIG. 8 is a top plan view of the automobile of FIGS. 6 and 7.

FIGS. 6 to 8 one embodiment of a mirror system (shown schematically), generally indicated at 1, attached to an automobile 2 according to the present invention is illustrated. The conventional side view mirrors have been replaced with left and right viewing devices 3, 4 installed on to the automobile 2 to provide a view 5 to the rear along the side of the vehicle and also to enable a driver to see if another vehicle is in the blind spot 6 as shown in FIG. 8. The right and left viewing devices 3, 4 are preferably mounted in the driver side and passenger side doorframes, 7, 8 of the automobile in front of the driver's position 9 at the bottom 10, 11 of windows 12, 13. In this embodiment the viewing surfaces of the left and right viewing devices 3,4, are moved into the vehicle. This allows the driver to see more directly into the "side view mirrors" in order to see along the side and to the rear of the vehicle without turning his head.

Figure 9:
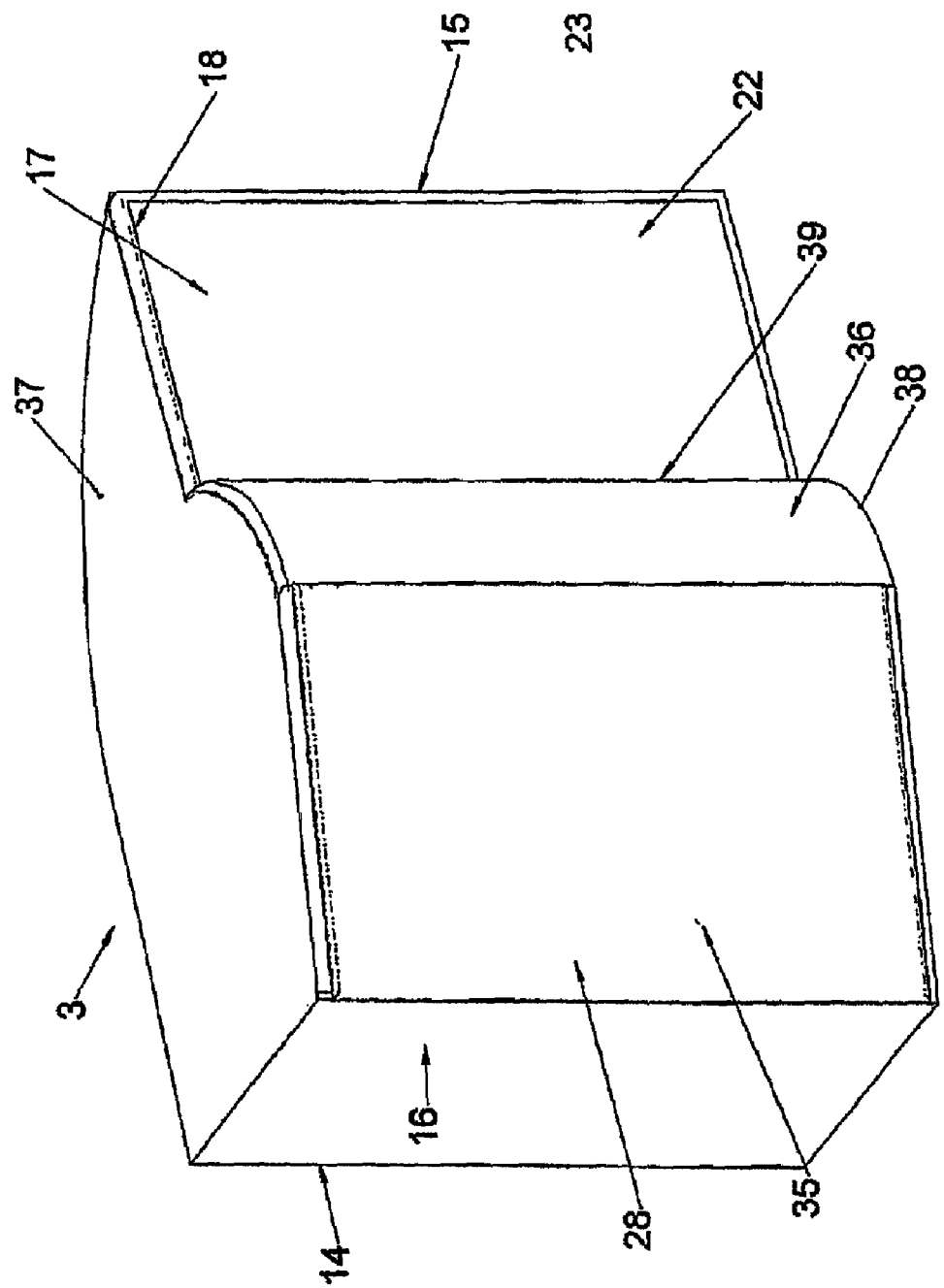
FIG. 9 is a perspective schematic view of one embodiment of a left side-viewing device of the mirror system of FIG. 6 according to the present invention.
Figure 10:
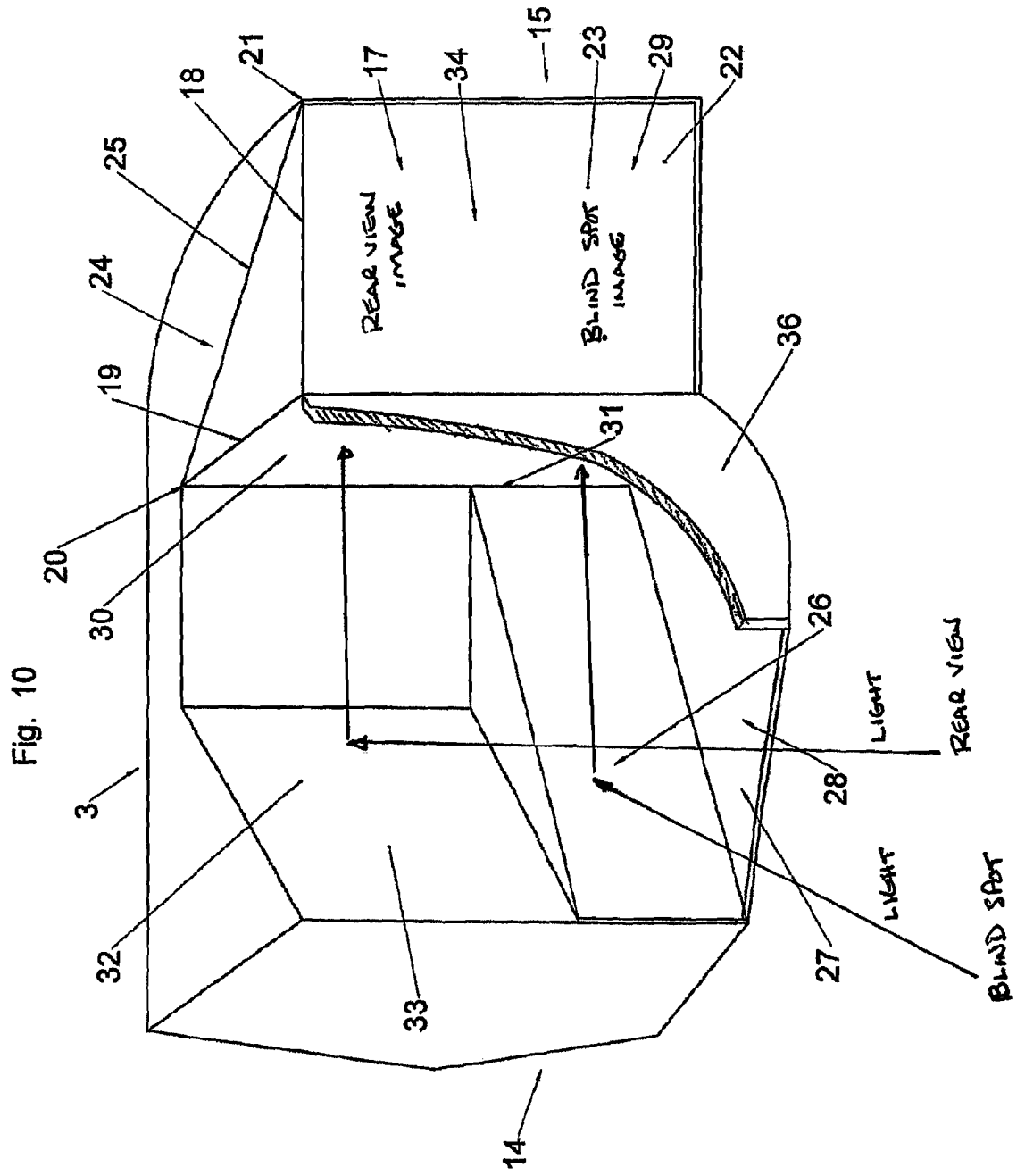
FIG. 10 is another schematic view of the left side-viewing device of FIG. 9 with the left and topside exposed.

FIGS. 9 and 10 illustrate schematically one embodiment of the left viewing device 3, of the type shown in FIGS. 6-8 for installation on the driver's side doorframe 7. In this embodiment the left viewing device 3 is located in a mirror housing 14 adapted for mounting on the doorframe of the vehicle. The configuration of the mirror housing and its method of attachment to the doorframe can vary without departing from the scope of the invention. The mirror housing 14 has a first section 15 containing a viewing surface in the interior of the vehicle 2 and a second section 16 optically open to the outside of the vehicle.

The first and second sections 15,16 of mirror housing 14 are sized and shaped to contain the operative optical elements described below.

The first section 15 of the mirror housing 14 is sized and shaped to contain operative optical elements comprising one or more right angle triangular prisms. In FIGS. 9 and 10 a single right angle triangular prism 17 with two sides 18, 19 of equal length and two vertices 20,21 of equal angles (i. e. 45) is shown. The prism 17 is mounted in the first section 15 of the mirror housing 14 so that one 18 of the two sides of equal length of prism 17 is positioned in an opening 22 to provide a viewing surface 23. The second one 19 of the sides of equal length is facing to the left. In the embodiment illustrated a prism with two sides of equal length is utilized in order to optimize the field of vision in the viewing surface. Further a right angle triangular prism having two vertices of equal angles (i. e. 45) is used in order to obtain total reflection of the incident light from the side of the prism. As noted the critical angle for glass is about 42. While small variation in the geometry of the prism maybe possible (plus or minus 1 to 2 degrees from the right angle), if the incident light from the side of the prism hits the second one 19 of the sides of the prism at other than perpendicular it will be refracted about 1.5 degrees for each degree from perpendicular. This results in the refracted light in the prism hitting the far side 24 of the prism at an angle other than 45 degrees. If the angle is less than 42 degrees the light will pass through the prism rather than being reflected to the viewing surface. In the embodiment shown one right angle prism is utilized however two or more prisms stacked on top of each other, end to end, could be utilized. In the embodiment shown, viewing surface 23 is about 8 cm wide by 18 cm high, although different dimensions can be used without departing from the scope of the invention. The third side 24 of prism 17 connecting the vertices 20,21 (i. e. the hypotenuse) preferably has its external surface 25 coated with an opaque or reflective material to block light from back lighting the images appearing in the viewing surface 23. The prism 17 may be mounted in a manner to permit adjustment of the prism to accommodate drivers of different sizes however the inventor has determined that if the left viewing device 3 is positioned in front of the driver and at the bottom of the window in the door at the height of the dashboard, adjustment is normally unnecessary and the prism can be fixed in position.

The second section 16 of the mirror housing 14 is sized and shaped to contain operative optical elements comprising one or more reflective or refractive means. In the embodiment illustrated, as best seen in FIG. 10, a first flat mirror 26 is positioned in the bottom 27 of an opening 28 of the second section 16 of the mirror housing 14 adjacent the vertices 20 the prism 17. The first flat mirror 26 is mounted in a manner to permit the driver to look through the lower section 29 of the first viewing surface 23 of the prism 17 and see if another vehicle is in the blind spot area along the side of the vehicle. In order to detect if another vehicle is in the blind spot, the first flat mirror 26 is preferably mounted at an angle of between 50 to 70 degrees, preferably about 60 degrees to the surface 30 of the side 19 of the prism 17 facing to the left. The first flat mirror angle can optionally be adjusted preferably from about 1 to 5 degrees using electronic or mechanical means such as electromagnets. FIG. 10 shows the pivot point 31 of the first flat mirror 26.

In the embodiment illustrated, as best seen in FIG. 10, a second flat mirror 32 is mounted in the top rear 33 of the opening 28 in the second section 16 of the mirror housing 14 adjacent the vertices 20 the prism 17. The second flat mirror 32 is mounted in a manner to permit the driver to look through the top section 34 of the first viewing surface 23 of the prism 17 and see the backview area along the side of the vehicle. In order to view the backview area the second flat mirror 32 is preferably mounted at an angle of between 35 to 50 degrees, preferably about 45 degrees to the surface 30 of the side 19 of the prism 17 facing to the left. The second flat mirror angle 32 can optionally be adjusted preferably from about 1 to 5 degrees using electronic or mechanical means such as electromagnets.

FIG. 10 shows the pivot axle for the second flat mirror.

The second section 16 is preferably equipped with means to protect it from damage and weather conditions. In the embodiment illustrated, a protective transparent cover 35

(preferably one way glass) may cover the opening 28 in the second section 16 of the mirror housing 14.

In the embodiment of FIGS. 9 and 10 a vertical outer wall 36 is provided from the top 37 to the bottom 38 of the mirror housing 14 between the edge 39 of the prism 17 and the protective transparent cover 35 to prevent the driver from viewing directly into the first or second flat mirrors 26,32.

It is possible to have configuration of the flat mirrors 26,32 in FIGS. 9 and 10 reversed so that flat mirror 26 in combination with prism 17 is used to view to the rear and along the side of the vehicle and flat mirror 32 in combination with prism 17 is used to detect when a vehicle is in the blind spot.

It is also possible, using the concept shown in FIG. 4A, to replace the second flat mirror 32 with a second right angle triangular prism. The second prism is mounted in place of the second flat mirror 32, similar to the arrangement shown in FIG. 4A to permit the driver to see to the rear along the side of the vehicle.

Figure 11:
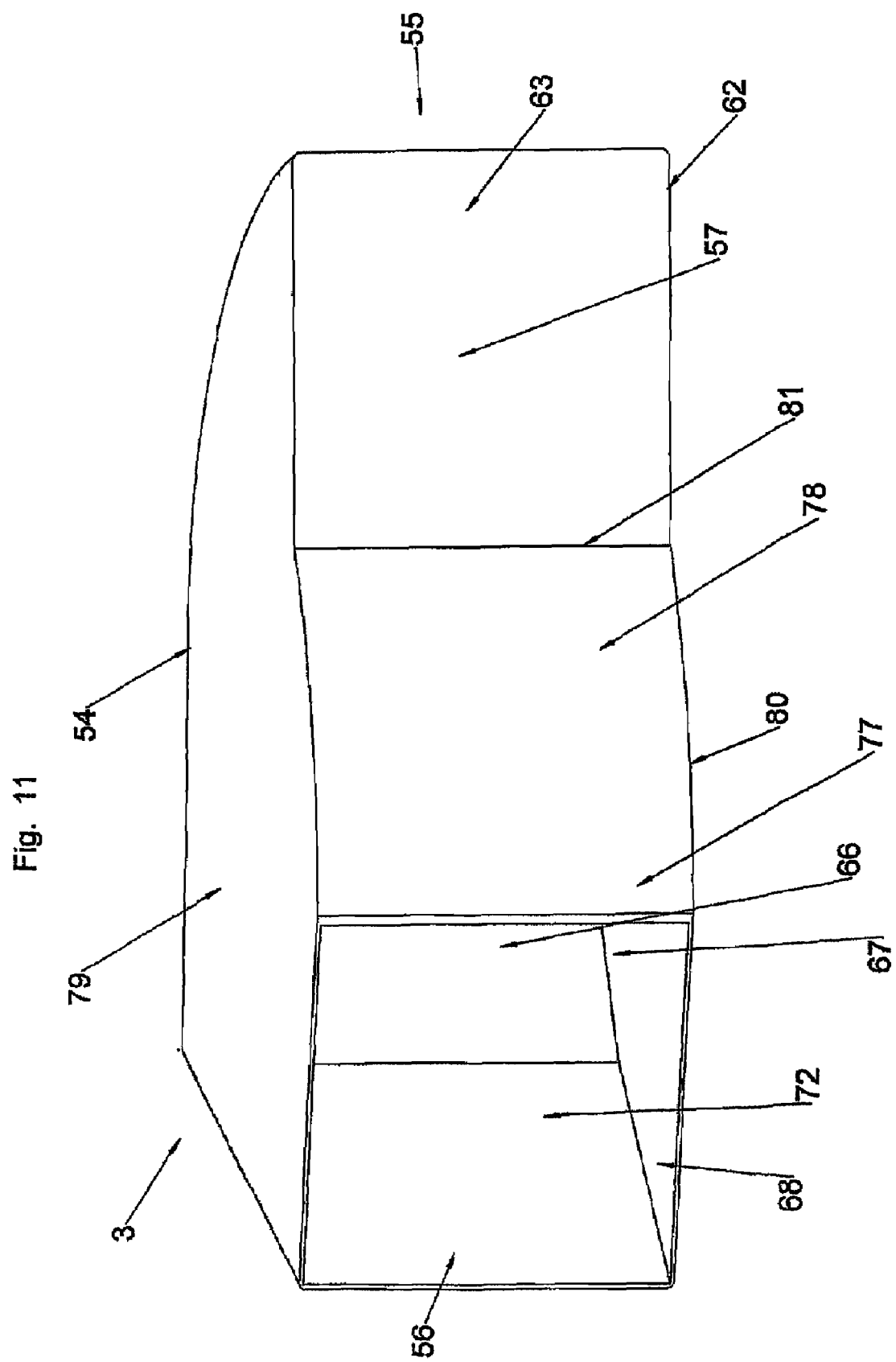
FIG. 11 is a schematic perspective view of another embodiment of a left side-viewing device according to the present invention with the left side exposed.
Figure 12:
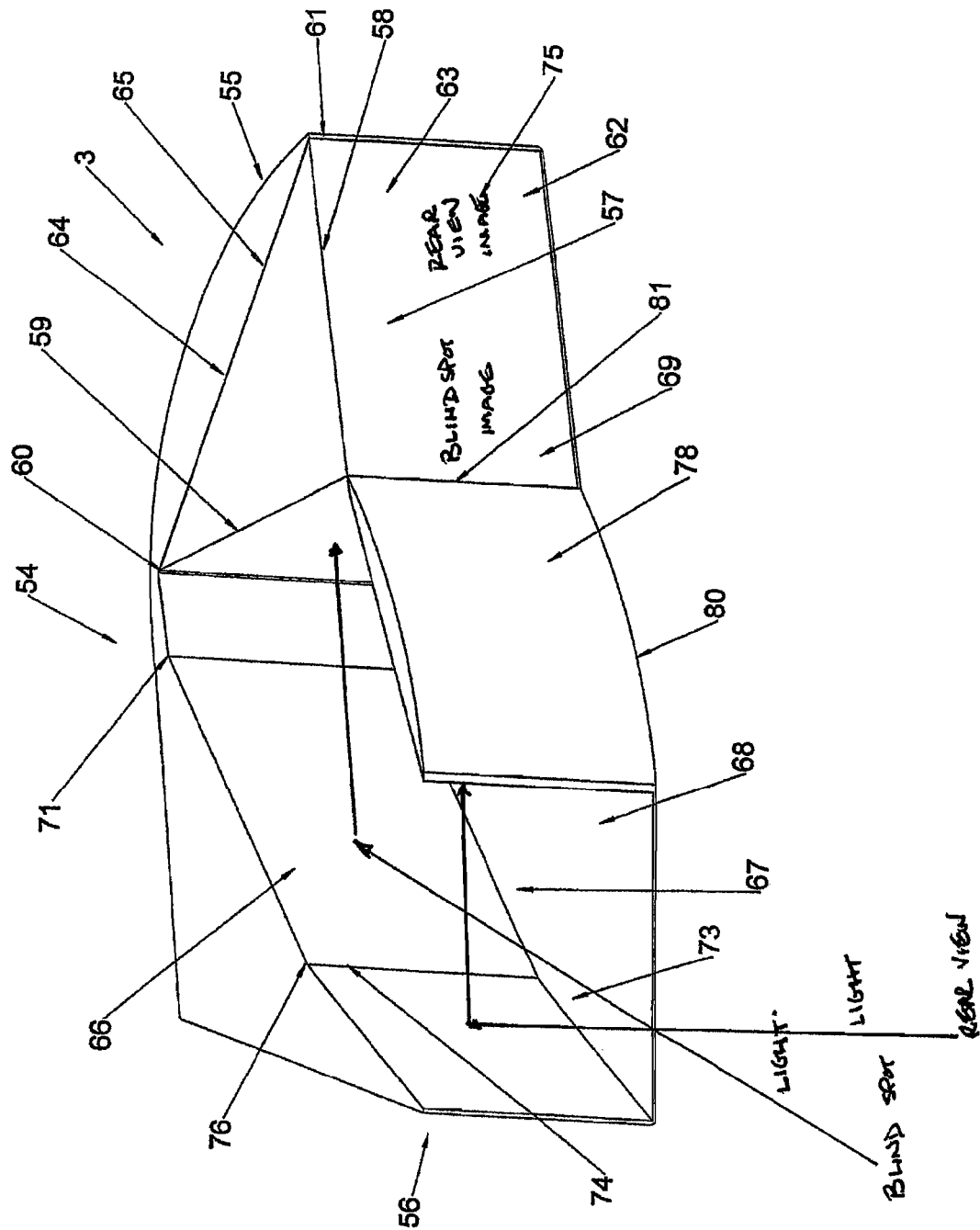
FIG. 12 is another schematic view of the left side-viewing device of FIG. 11 with the left and topside exposed.

Rather than have the optical elements in the second section 16 of the mirror housing 14 arranged vertically it is possible to use a horizontal arrangement as illustrated in FIGS. 11 and 12. FIGS. 11 and 12 illustrate another embodiment of the left viewing device 3, of the type shown in FIGS. 6-8 for installation on the driver's side doorframe 7. In this embodiment the left viewing device 3 is located in a mirror housing 54 adapted for mounting on the doorframe of the vehicle. The configuration of the mirror housing and its method of attachment to the doorframe can vary without departing from the scope of the invention. The mirror housing 54 has a first section 55 containing a viewing surface in the interior of the vehicle 2 and a second section 56 optically open to the outside of the vehicle. The first and second sections 55,56 of mirror housing 54 are sized and shaped to contain the operative optical elements described below.

The first section 55 of the mirror housing 54 is sized and shaped to contain operative optical elements comprising one right angle triangular prism 57 with two sides 58, 59 of equal length and two vertices 60,61 of equal angles (i. e. 45) is shown. The prism 57 is mounted in the first section 55 of the mirror housing 54 so that one 58 of the two sides of equal length of prism 57 are positioned in an opening 62 to provide a viewing surface 63. The other one 59 of the sides of equal length is facing to the left. In the embodiment shown viewing surface 63 is about 18 cm wide by 8 cm high, although different dimensions can be used without departing from the scope of the invention. The third side 64 of prism 57 connecting the vertices 60,61 (i. e. the hypotenuse) preferably has its external surface 65 coated with an opaque or reflective material to block light from back lighting the images appearing in the viewing surface 63. The prism 57 may be mounted in a manner to permit adjustment of the prism to accommodate drivers of different sizes however the present inventor has determined that if the left viewing device 3 is positioned in front of the driver and at the bottom of the window in the door at the height of the dashboard, adjustment is normally unnecessary and the prism can be fixed in position. It is best that prism 57 be adjusted so that viewing surface 63 is perpendicular to the driver's line on sight when looking at the viewing surface 63.

The second section 56 of the mirror housing 54 is sized and shaped to contain operative optical elements comprising two different reflective or refractive means. In the embodiment illustrated, as best seen in FIG. 12, a first flat mirror 66 is positioned in the rear 67 of the second section 56 of the mirror housing 54 adjacent the vertices 60 the prism 57 and behind an opening 68 in the front of the second section 56. The first flat mirror 66 is mounted in a manner to permit the driver to look through the left side 69 of the first viewing surface 63 of the prism 57 and see if another vehicle is in the blind spot area along the side of the vehicle. In order to detect if another vehicle is in the blind spot, the first flat mirror 66 is preferably mounted at an angle of between 50 to 70 degrees, preferably about 60 degrees to the surface 70 of the side 59 of the prism 57 facing to the left. The first flat mirror angle can optionally be adjusted preferably from about 1 to 5 degrees using electronic or mechanical means such as electromagnets. FIG. 12 shows the pivot point 71 of the first flat mirror 66.

In the embodiment illustrated, as best seen in FIG. 12, a second flat mirror 72 is mounted in the rear 73 of the second section 56 of the mirror housing 54 adjacent the remote edge 74 of the first flat mirror 66. The second flat mirror 72 is mounted in a manner to permit the driver to look through the right section 75 of the first viewing surface 63 of the prism 57 and see the backview area along the side of the vehicle. In order to view the backview area the second flat mirror 72 is preferably mounted at an angle of between 35 to 50 degrees, preferably about 45 degrees to the surface 70 of the side 59 of the prism 57 facing to the left. The second flat mirror angle 72 can optionally be adjusted preferably from about 1 to 5 degrees using electronic or mechanical means such as electromagnets.

FIG. 12 shows the pivot point 76 for the second flat mirror 72. The second section 16 is preferably equipped with means to protect it from damage and weather conditions. In the embodiment illustrated, a protective transparent cover 77 (preferably one way glass) may cover the opening 68 in the second section 56 of the mirror housing 54.

In the embodiment of FIGS. 11 and 12 a vertical outer wall 78 is provided from the top 79 to the bottom 80 of the mirror housing 54 between the edge 81 of the prism 57 and the protective transparent cover 77 to prevent the driver from viewing directly into the first or second flat mirrors 66,72.

It is possible to have the configuration and function of the flat mirrors 66,72 in FIGS. 11 and 12 reversed so that flat mirror 66 in combination with prism 57 is used to view to the rear and along the side of the vehicle and flat mirror 72 in combination with prism 57 is used to detect when a vehicle is in the blind spot.

Figure 13:
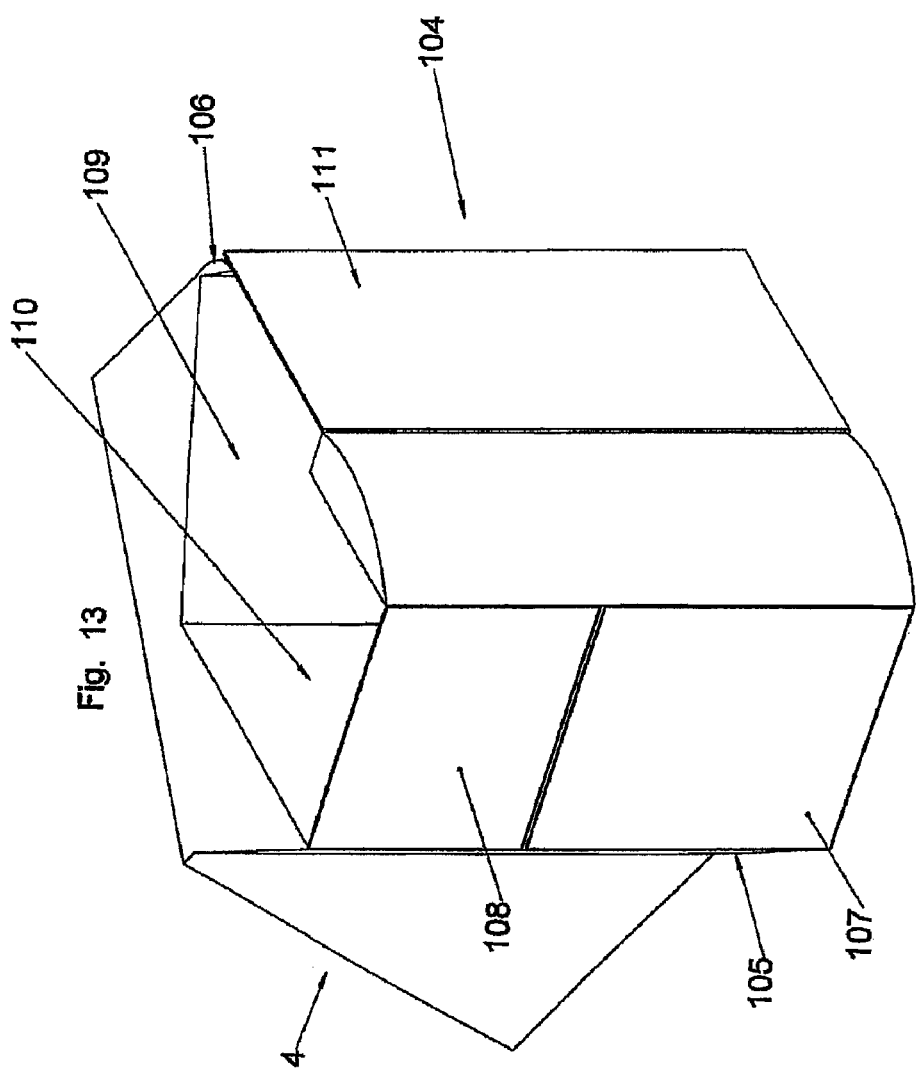
FIG. 13 is a schematic perspective view of one embodiment of a right side viewing device of the mirror system of FIG. 6 according to the present invention with the topside exposed.
Figure 14:
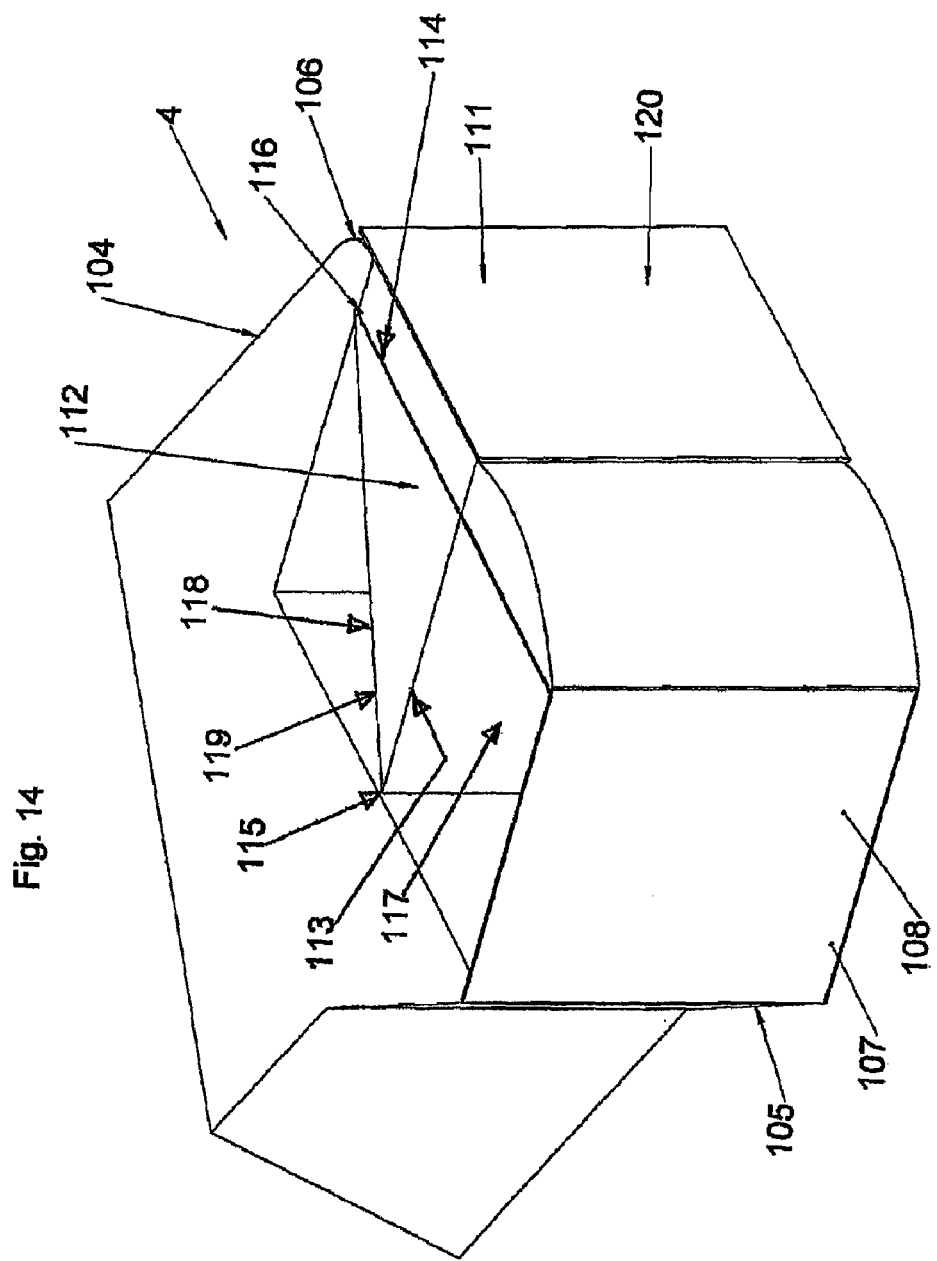
FIG. 14 is a schematic view in partial cross section of the right side viewing device of FIG. 13.

FIGS. 13 and 14 illustrates one embodiment of the right side viewing 4 of the type shown in FIGS. 6-8 for installation on the passenger's side door frame. In this embodiment the right side viewing device 4 is located in a mirror housing 104 adapted for mounting on the doorframe of the vehicle. The configuration of the mirror housing and its method of attachment to the doorframe can vary without departing from the scope of the invention. The mirror housing 104 has a first section 105 in the interior of the vehicle 2 and a second section 106 optically open to the outside of the vehicle. The first and second sections 105, 106 of mirror housing 104 are sized and shaped to contain the operative optical elements described below.

The first section 105 of the mirror housing 104 is sized and shaped to provide the driver with an unobstructed view of the operative optical elements located in the second section 106. The first section 105 of the mirror housing has a opening 107 facing the driver. A transparent glass cover 108 is shown over the opening 107 in the first section 105.

The second section 106 of the mirror housing 104 is sized and shaped to contain operative optical elements comprising two different reflective or refractive means. In the embodiment illustrated, as best seen in FIG. 13, a first flat mirror 109 is positioned in the top 110 of the second section 106 of the mirror housing 104 behind an opening 111 in the second section 106. The first flat mirror 109 is mounted in a manner to permit the driver to look through the opening 107 of the first section 105 and see along the side of the vehicle to the rear. In order to see the desired area, the first flat mirror 109 is preferably mounted at an angle of between 55 to 65 degrees. The flat mirror 109 preferably is adjustable. In the embodiment shown the second reflective means consists of a right angle triangular prism 112 with two sides 113,114 of equal length and two vertices 115,116 of equal angles (i. e. 45). The prism 112 is mounted in the bottom of second section 106 of the mirror housing 104 so that one 114 of the two sides of equal length of prism 112 are positioned in the opening 111 to face to the side and rear of the vehicle. The other one 113 of the sides of equal length is facing to the driver to provide a viewing surface 117. In the embodiment shown viewing surface 117 is about 8 cm wide by 8 cm high, although different dimensions can be used without departing from the scope of the invention. The third side 118 of prism 112 connecting the vertices 115, 116 (i. e. hypotenuse) preferably has its external surface 119 coated with an opaque or reflective material to block light from back lighting the images appearing in the viewing surface 117. The prism is mounted so to permit the driver to see through the second side of the prism and see the blind spot along the side of the vehicle. The prism 112 may be mounted in a manner to permit adjustment of the prism to accommodate drivers of different sizes however the present inventor has determined that if the right side viewing device 4 is positioned in front of the driver and at the bottom of the window in the door at the height of the dashboard, adjustment is normally unnecessary and the prism can be fixed in position. It is best that prism 112 be adjusted so that viewing surface 117 is perpendicular to the driver's line of sight when looking at the viewing surface 117. The mirror system is further equipped with means to protect it from damage and weather conditions. In the embodiment shown the protective means is a transparent glass cover 120 over the opening 111 in the second section 106.

Figure 15:
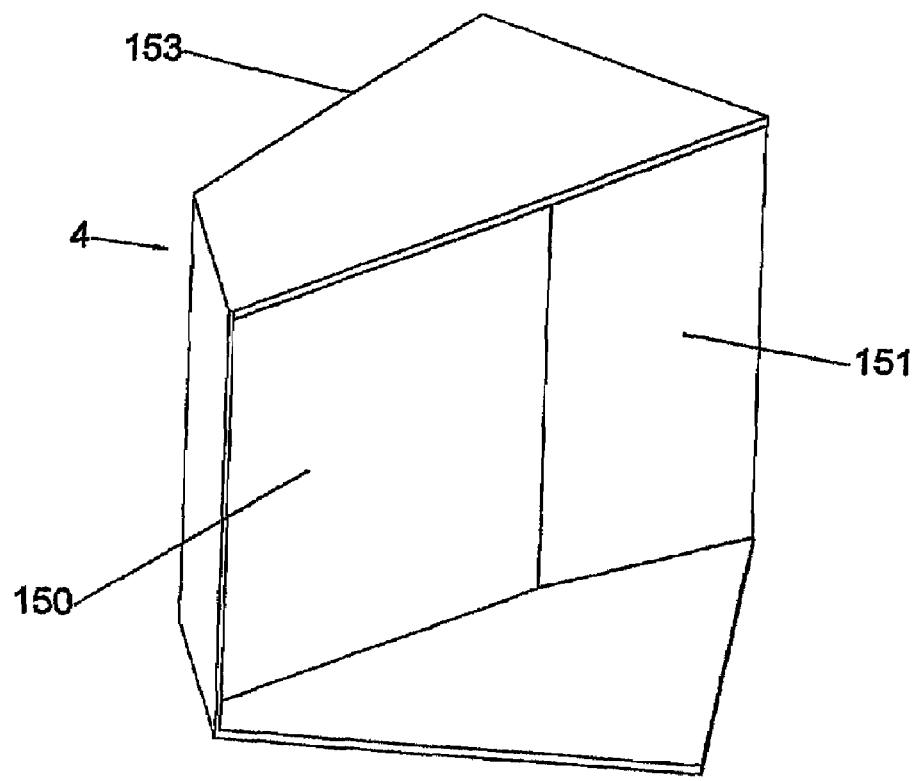
FIG. 15 is a schematic perspective view of another embodiment of a right side viewing device of the mirror system of FIG. 6 according to the present invention.
Figure 16:
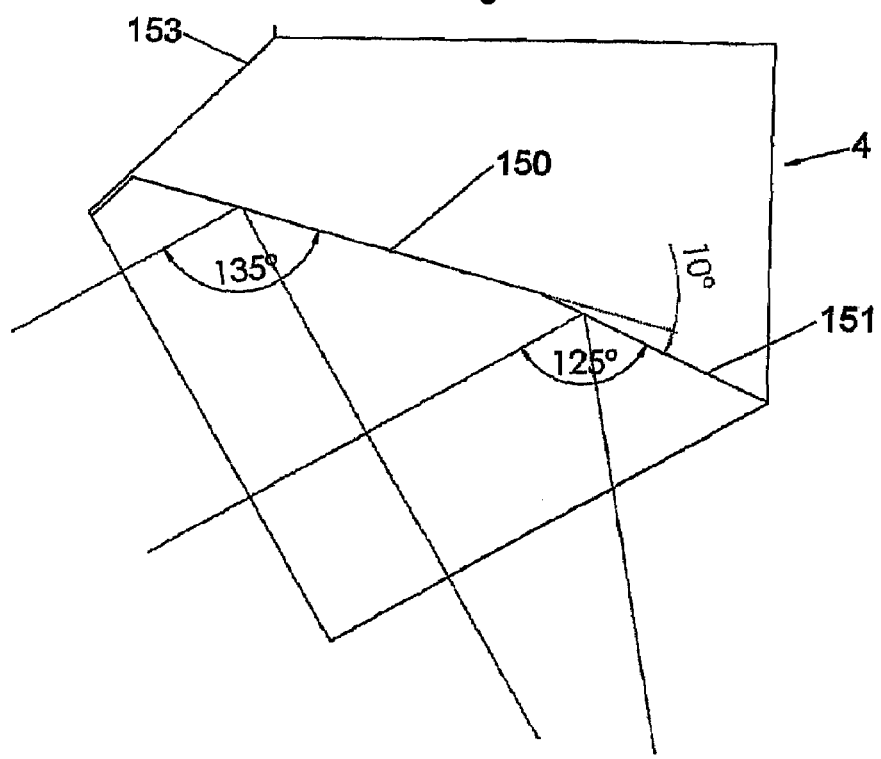
FIG. 16 is schematic plan view in cross section of the right side viewing device of FIG. 15.
Figure 17:
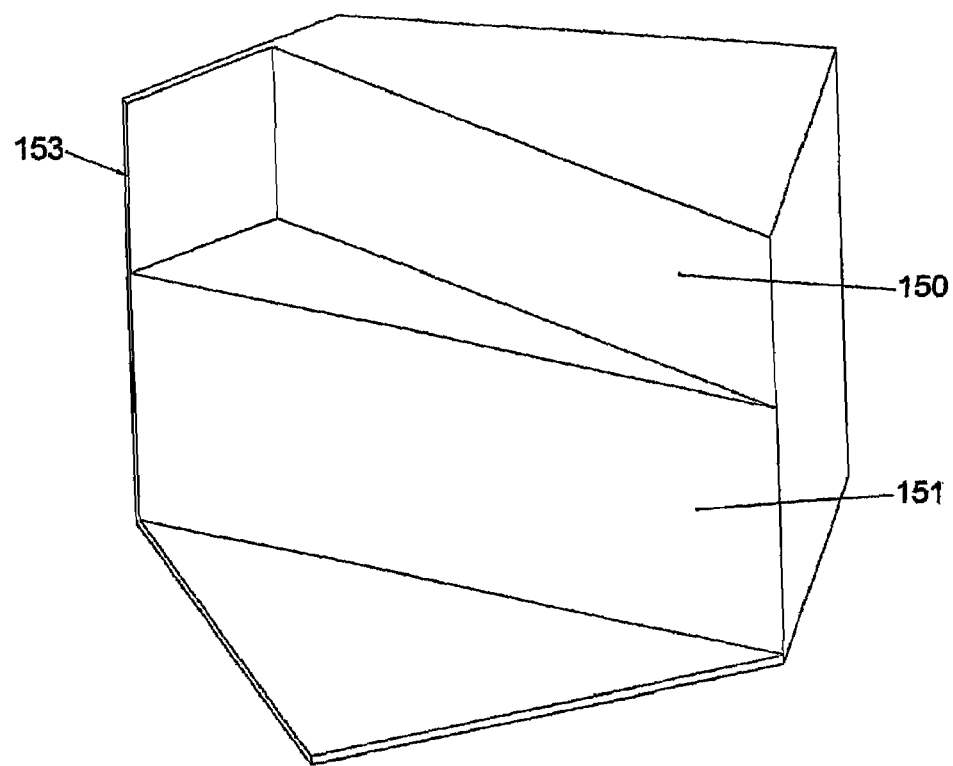
FIG. 17 is schematic view of the optical elements of another embodiment of a right side viewing device according to the present invention.

In other embodiments of the right side viewing device 4 illustrated in FIGS. 15 to 17, two flat mirrors are used to view the blind spot and along the side of the vehicle.

The flat mirrors 150,151 can be arranged side by side as shown in FIGS. 15 and 16 or one above the other as shown in FIG. 17. In either case the first flat mirror 150 is positioned in the mirror housing 153 to detect if another vehicle is in the blind spot and the second flat mirror 151 is used to view along the side of the vehicle and to the rear. In the embodiment shown the first flat mirror 150 is mounted in the mirror housing 153 at an angle of about 135 degrees to the driver's line of sight when looking at the right side viewing device. The second flat mirror 151 is mounted in the mirror housing 153 at an angle of about 125 degrees.

The mirror system of the present invention not only can enable the driver to see if another vehicle is in the blind spot on both sides of the automobile, it also reduces the external portion of the mirror by up to half the current size. The reduction in drag due to the smaller surface area of the portion of the mirror system outside the vehicle will provide significant benefits.

As illustrated in FIGS. 6-8, the mirror system of the present invention can be installed to contain a viewing surface inside a vehicle, at the area above the dashboard near the doorframes or it can become part of the doorframe at the area about where the external mirror is currently attached. It can provide a clear and unimpeded view of the blind spot area.

For the left side of the vehicle, this system allows the driver to look directly into the viewing surface, when it is placed at the location described previously, and see both the rear side view and the blind spot area without having to turn his head left. For the right side of the vehicle, the driver turns his eyes and looks into the device and sees both the rear side view and the blind spot area without turning his head 120 degrees.

This mirror system not only eliminates the blind spot areas on both side of the vehicle but it can also make the future design of the external side view mirrors half of their current size or eliminate them entirely. The viewing area of what the external mirrors provide may be complimented by the internal rear view mirror which all cars equipped with.

The reduction of drag due to the smaller size of external mirrors or their total elimination will be significant and will result in better fuel consumption for the vehicle.

Adjustment of the flat mirrors may be accomplished using conventional mechanical or electromagnetic means. For example an electromagnet is placed behind the flat mirror and another one is placed directly opposite on the internal housing wall of the device. The flat mirror is hinged at one point. Also a small spring maybe attached to both the back of the flat mirror and the side of the housing wall where the flat mirror lies. When the angle of viewing needs to be adjusted an electrical switch will activate the electromagnet on the housing wall that will push the mirror inwards. The process can be reversed.

Figure 18:
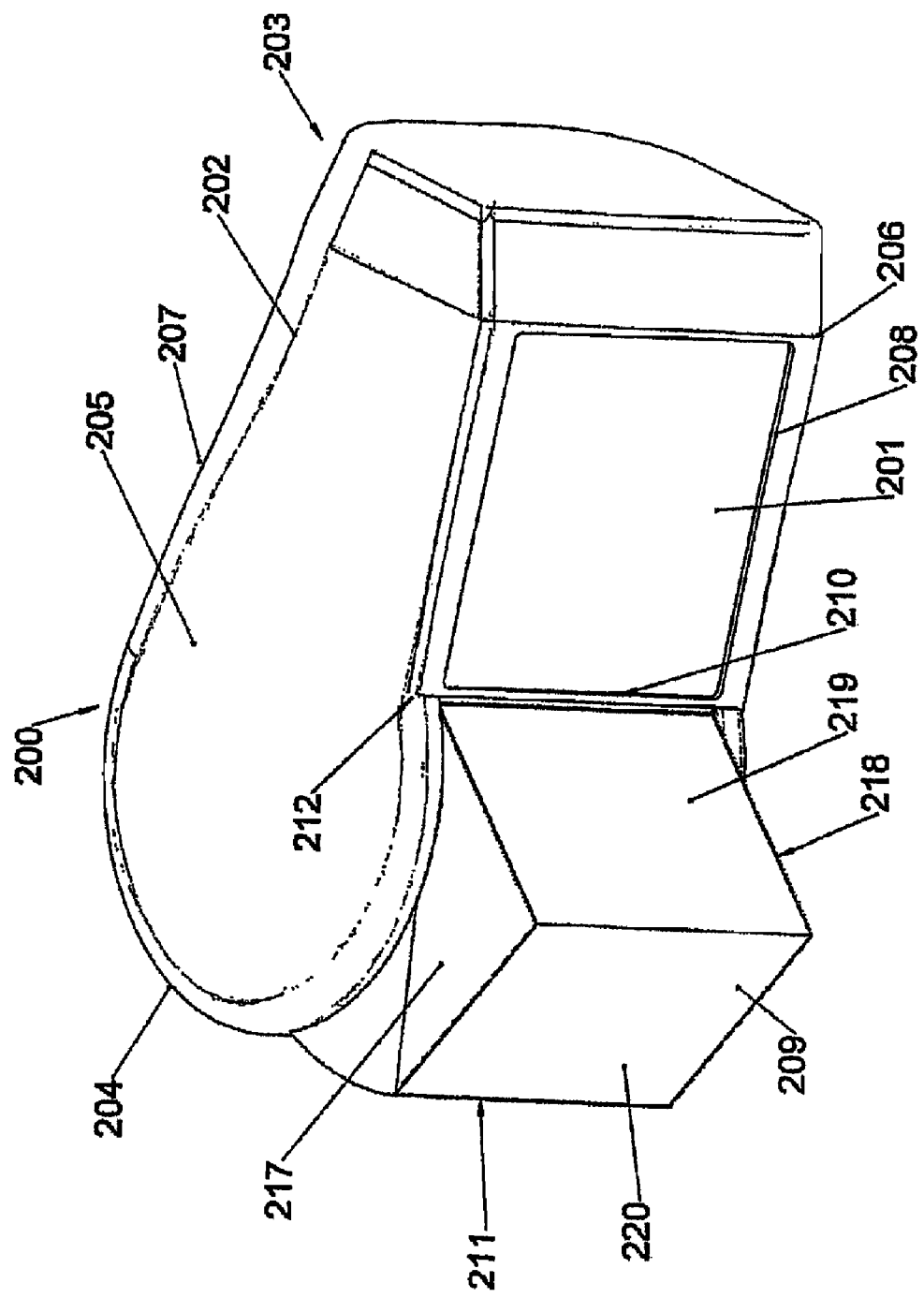
FIG. 18 is a schematic perspective view of another embodiment of an automobile side mirror equipped with a retractable blind spot mirror of the present invention.
Figure 19:
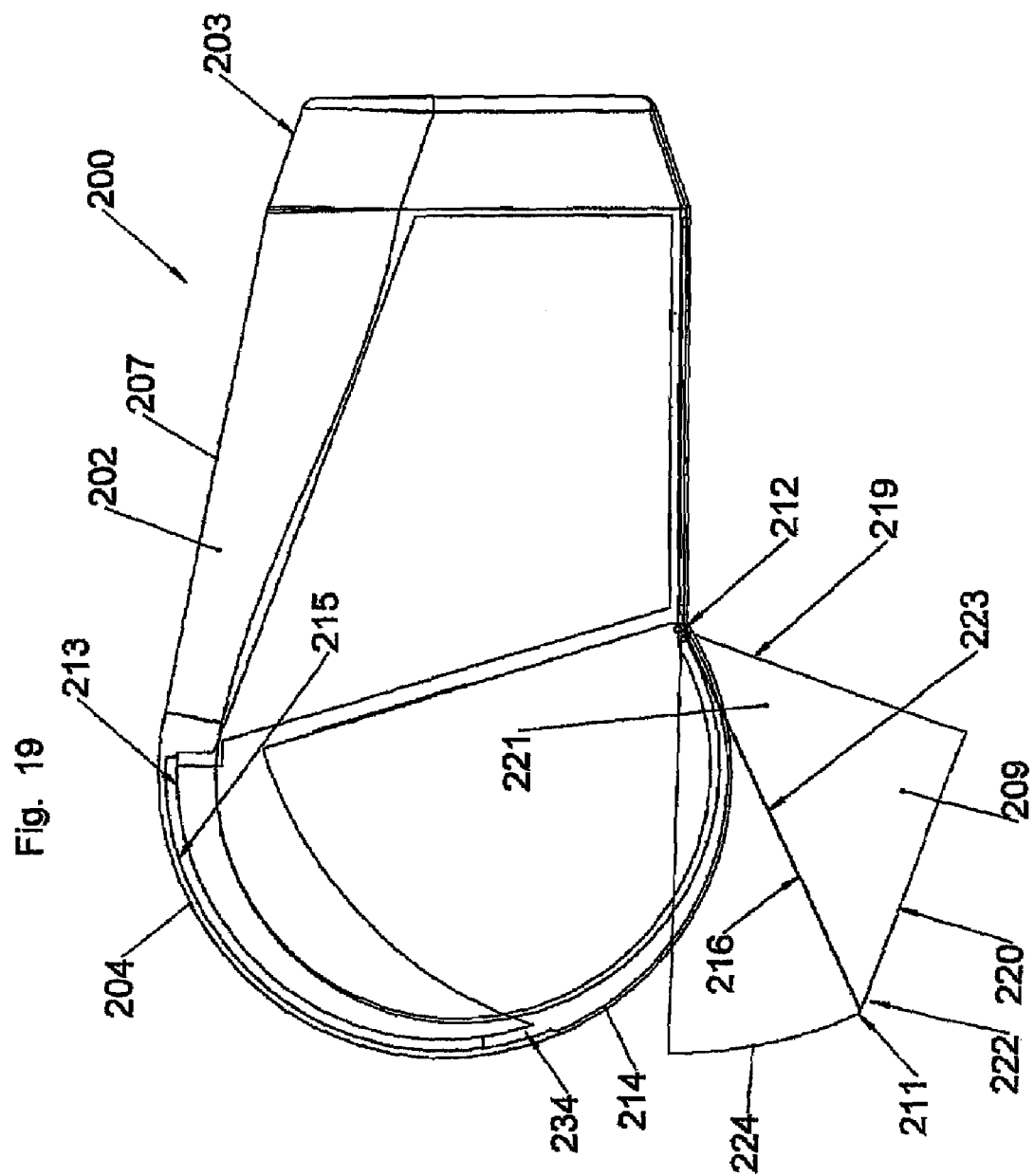
FIG. 19 is a top plan view in cross section of the automobile mirror of FIG. 18.

The benefits of the mirror system of the present invention include: a. It comprehensively eliminates the blind spot area on both left and right side of the car b. It provides a crystal clear view of the bind spot (s) area c. It can be adjusted to accommodate the seating position of the driver d. Objects appear in it in actual sizes-there is no distortion e. Objects are shown at real distances, e. g. object is as far or near as it appears to be f. It can be weather proof (protected by snow, ice, fog) With reference to FIGS. 18 to 20, another embodiment of a mirror system that includes a right angle triangular prism for viewing the blind spot is illustrated. FIG. 18 illustrates a typical automobile left side mirror, generally indicated at 200. The side mirror 200 has a planar mirror 201 mounted in a mirror housing 202 adapted to be attached to the side of a vehicle. In the embodiment shown, the mirror housing 202 has a rearwardly open box configuration with a first end 203 adapted for attachment to the vehicle and a remote end 204. The mirror housing 202 has a top 205, bottom 206 and front wall 207. The mirror 201 is mounted in the opening 208 of mirror housing 202. In the embodiment illustrated, a right triangular angle prism 209 is located at the outer end 210 of the side mirror 201 to permit the driver to view the blind spot. In the embodiment illustrated, the right angle triangular prism 209 is pivotally mounted adjacent the remote end 204 of mirror housing 202. The prism 209 is connected to means to permit the prism to be rotated from an open to a closed position. In the embodiment illustrated the prism 209 is mounted on a mirror plate 211 that may rotate on axis 212 to permit adjustment. When the prism 211 is in the closed position, shutter 213 preferably activates to cover the opening 214 in the mirror housing 202 through which the prism 209 and mirror plate 211 move from the open to closed position and vice versa. Similarly before the prism 209 can move from the closed to the open position shutter 213 retracts into mirror housing 202. While FIGS. 18 and 19 illustrate the right angle prism 209 mounted so it can be retracted within the mirror housing 202, the present invention is not so limited to.

The mirror housing 202 is sized and shaped to accommodate the mirror 201, prism 209 and mirror plate 211 when they are fully retracted within the housing. Shutter 213 preferably moves along a track 234 attached to the inside surfaces 215 of the top 205 and bottom 206 walls of the mirror housing 202 adjacent the remote end 204 to allow shutter 213 to travel when it is retracted to an open and closed position.

The mirror-plate 211 has a vertical base 216 and top 217 and bottom 218 plate sections. The prism 209 has two sides 219,220 of equal length and two vertices 221,222 of equal angles (i. e. 45). The prism 209 is mounted in the mirror plate 211 so that the side 223 connecting the two vertices 221,222 (i. e. hypotenuse) is against the vertical base 216.

The back 224 of the vertical base 216 is preferably shaped in a round manner to fit the path of the radius of the mirror plate 211 and prism 209 when they are rotated. This design of the back 224 of the vertical base 216 helps reduce the wind resistance when the automobile is in motion and in addition shows the retractable mirror being a part or a natural extension of the housing of the whole mirror.

The mirror plate 211 is mounted to permit rotation about axis 212. The shutter 213 and the mirror-plate 211 (carrying the prism 209) preferably are moved by electric power activated by a switch in the vehicle. Moreover the mirror plate 211 that carries the right angle prism 209 can be adjusted by an electrical switch from inside the car in such a manner that the blind spot is viewed unimpeded and in sync with the sitting position of the driver. This adjustment can be done independently for both mirrors on either side of the automobile. In order view the blind spot, the prism 209 is adjusted so one 219 of the two sides 219,220 of equal length is perpendicular to the line of sight of the driver when the driver is looking at the prism 209 to provide a viewing surface. The driver will then be able to see objects that are 90 to the left of this line of sight (i. e. the blind spot).

Figure 20:
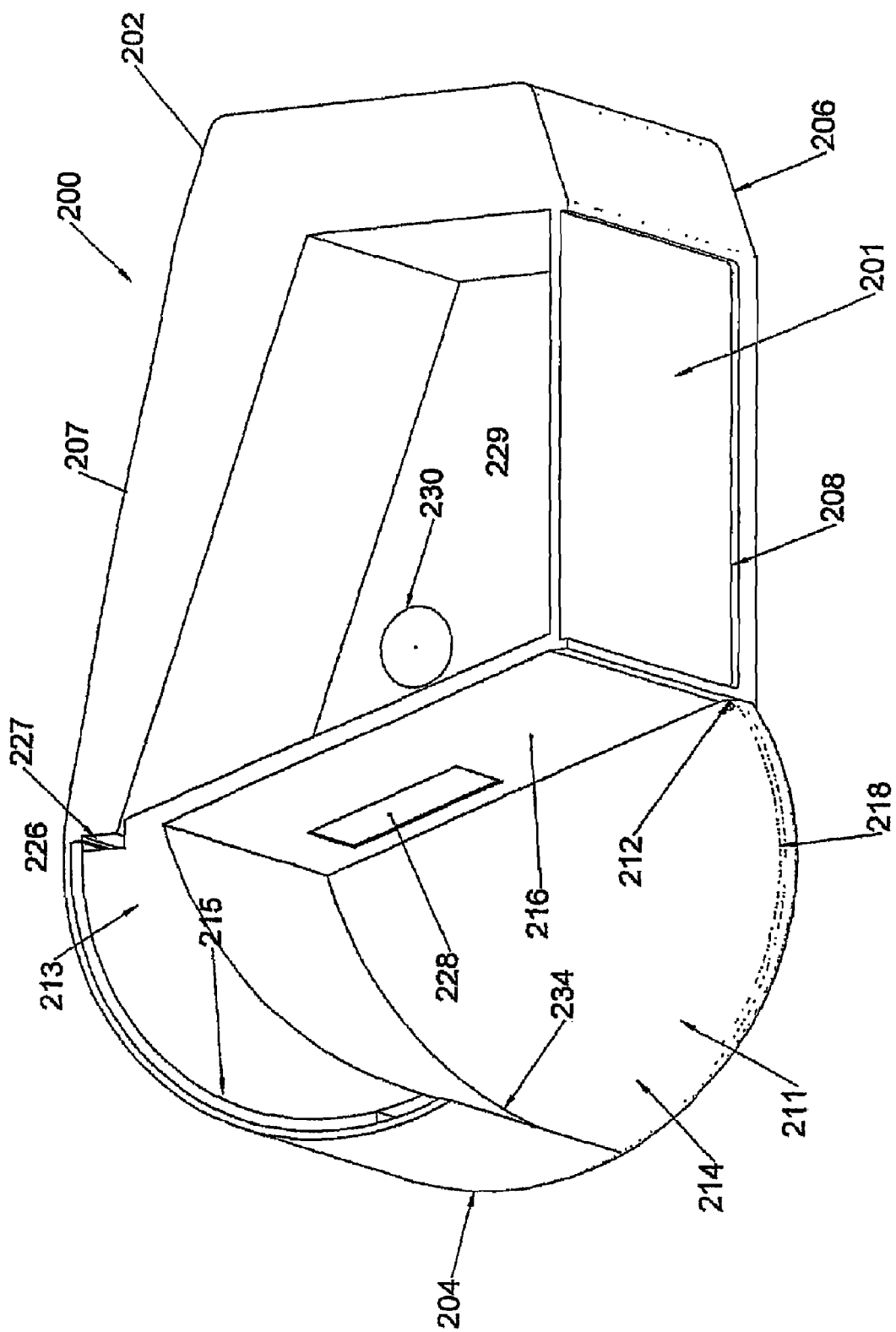
FIG. 20 is a sectional view of operation of retraction for mirror of FIG. 18.

The present invention is not limited to any particular method of rotating the right angle prism from an open to a closed position. Both electronic and mechanical methods are practical. As shown in FIG. 20, in one method of adjustment, the mirror housing 202 has a circular track 234 around its outer end 204. At one end 226 of track 234 is a thin electromagnet 227. The shutter 213 runs along the track 234. One end of the shutter 213 is coated with a metallic material or the shutter 213 can be made of a metallic material. A second electromagnet 228 is located on a internal wall 229 separating the side view mirror 201 from the right angle prism 209. The mirror plate 211 is also preferably made of metal. An electronic switch 230 is installed in the housing 202 which connects to both electromagnets 227,228. The switch 230 can be used to activate the magnets and cause either the shutter 213 to move along track or the mirror plate 211 to rotate about its axis.

While the preceding description describes the left side mirror equipped with a retractable prism according to the present invention, the right side mirror can be constructed and operates in a similar manner.

With this invention the blind spots on either side of a vehicle can be substantially eliminated and the driver does not have to keep turning his head 120 degrees in order to ensure clearance on either side of the vehicle before changing lanes.

Moreover the driver when looking at the prism is seeing the items/objects in it at real dimensions. That is what he/she is looking at is as far or as near as it appears.

This is mentioned because many drivers install small convex mirrors on the outer mirrors (left & right) in order to get a glimpse of the blind spot area. The items/objects appearing in a convex mirror are closer than they appear.

This definitely constitutes a danger factor for the driver when he's to change lanes.

Thus the driver will only have to move his eyes to look at either mirror, left and right in a normal manner and will be able to view the blind spot on either side of the vehicle/automobile.

Another advantage of this embodiment of the present invention is the fact that it is retractable. This means that the retractable mirror will move inside the end part of the mirror housing and the shutter blind activated, once the automobile has stopped and been turned off. The process is reversed of course once the automobile is started, the shutter blind opens and the prism is moved to the position where it can provide a view of the blind spot to the driver. This operation is done automatically for both left and right mirrors of the automobile. The driver will have the option of adjusting slightly the positioning of the prism to ensure it is providing a view of the blind spot area. The retractability of the prism will protect it from the elements and vandals.

Although various preferred embodiments of the present invention have been described herein in detail, it will be appreciated by those skilled in the art, that variations may be made thereto without departing from the spirit of the invention or the scope of the appended claims.

The invention claimed is:

1. A mirror system for a vehicle comprising:
a viewing device located in a mirror housing mounted on the vehicle wherein a first section of the mirror housing contains a viewing surface in an interior of the vehicle and a second section of the mirror housing optically open to an outside of the vehicle;
said viewing surface formed by one or more substantially right angle triangular prisms having two sides of substantially equal length and two vertices of substantially equal angles;
said one or more prisms mounted in the first section of the mirror housing so that one of the two sides of equal length of each of said one or more prisms is positioned in an opening facing the interior of the vehicle to provide the viewing surface;
a second one of the sides of equal length is facing to an exterior of the vehicle;
said second section of the mirror housing sized and shaped to contain operative optical elements comprising one or more reflective means mounted in the second section of the mirror housing at an angle to the second one of the sides of equal length of the one or more prisms in the first section of the mirror housing so that when the driver looks through the viewing surface of the one of more prisms the driver sees objects to the side of the vehicle in a first part of said viewing surface and objects to a rear of the vehicle in a second part of said viewing surface, wherein the reflective means mounted in the second section of the mirror housing has a first flat mirror positioned in the second section of the mirror housing in a manner to permit the driver to look through a first section of the viewing surface of the prism and see whether an object is in blind spot area along the side of the vehicle and second flat mirror to mounted in the second section of the mirror housing in a manner to permit the driver to look through the second part viewing surface of one or more prisms and see to the rear and along the side of the vehicle, the first flat mirror being disposed at an angle relative to the second flat mirror so that the first flat mirror is non-parallel to the second flat mirror, the first flat mirror and the second flat mirror facing the rear of the vehicle.

2. A mirror system according to claim 1 wherein the first flat mirror is mounted at an angle of between 50° to 70° degrees to the second one of the sides of equal length of the one or more prisms.

3. A mirror system according to claim 2 wherein the first flat mirror is mounted at an angle of about 60 degrees to the second one of the sides of equal length of the one or more prisms.

4. A mirror system according to claim 3 wherein the angle of the first flat mirror can be adjusted from about 1° to 50° degrees.

5. A mirror system according to claim 1 wherein the mirror system consists of a driver's side viewing device.

6. A mirror system according to claim 5 wherein the second flat mirror is mounted at an angle of between 35° to 50° degrees to the second one of the sides of equal length of the one or more prisms.

7. A mirror system according to claim 6 wherein the second flat mirror is mounted at an angle of about 45° degrees to the second one of the sides of equal length of the one or more prisms.

8. A mirror system according to claim 7 wherein the angle of the second flat mirror is adjustable from about 1° to 5° degrees.

9. A mirror system for a vehicle according to claim 6 wherein said second portion of the mirror housing has an opening facing along the side and to the rear of the vehicle and a diverging lens is placed adjacent said opening between the opening and the second flat mirror.

10. A mirror system for a vehicle according to claim 9 wherein the diverging lens is a plano-concave lens.

11. A mirror system according to claim 5 wherein the first flat mirror and the second flat mirror are mounted in the second section of the mirror housing one above the other.

12. A mirror system according to according to claim 5 having only one substantially right angle triangular prism having two sides of substantially equal length and two vertices of substantially equal angles mounted in the first section of the mirror housing and wherein the first flat mirror and the second flat mirror are mounted in the second section of the mirror housing laterally beside each other.

13. A mirror system according to claim 1 having two substantially right angle triangular prisms having two sides of substantially equal length and two vertices of substantially equal angles mounted in the first section of the mirror housing one above the other.

14. A mirror system according to claim 1 wherein means are provided for said section of the mirror housing so that the operative optical elements are protected from the elements and permit the driver to see objects to the side and rear of the vehicle.

15. A mirror system according to claim 14 wherein said means are provided for said section of the mirror housing so that the operative optical elements are protected from the elements and permit the driver to see objects to the side and rear of the vehicle is a transparent cover placed over the rear of said second section of said mirror housing.

16. A mirror system for a vehicle according to claim 1 wherein said viewing device is mounted adjacent a front door frame.

17. A mirror system for a vehicle according to claim 10 wherein the viewing device is mounted in a front door frame.

* * * * *